US010551694B2

(12) United States Patent
Ikeda et al.

(10) Patent No.: US 10,551,694 B2
(45) Date of Patent: Feb. 4, 2020

(54) LIQUID CRYSTAL DEVICE

(71) Applicant: Japan Display Inc., Tokyo (JP)

(72) Inventors: Kojiro Ikeda, Tokyo (JP); Masaaki Kabe, Tokyo (JP); Shinichiro Oka, Tokyo (JP); Chikyu Nakaoka, Tokyo (JP)

(73) Assignee: Japan Display Inc., Tokyo (JP)

( * ) Notice: Subject to any disclaimer, the term of this patent is extended or adjusted under 35 U.S.C. 154(b) by 161 days.

(21) Appl. No.: 15/798,504

(22) Filed: Oct. 31, 2017

(65) Prior Publication Data

US 2018/0129092 A1 May 10, 2018

(30) Foreign Application Priority Data

Nov. 7, 2016 (JP) .................. 2016-217137

(51) Int. Cl.
*G02F 1/1343* (2006.01)
*G02F 1/137* (2006.01)
*G02F 1/1335* (2006.01)

(52) U.S. Cl.
CPC .......... *G02F 1/13439* (2013.01); *G02F 1/137* (2013.01); *G02F 1/134309* (2013.01); *G02F 1/134363* (2013.01); *G02F 1/133553* (2013.01); *G02F 2001/13756* (2013.01); *G02F 2001/134372* (2013.01)

(58) Field of Classification Search
CPC ......... G02F 1/134309; G02F 1/134363; G02F 1/134327
See application file for complete search history.

(56) References Cited

U.S. PATENT DOCUMENTS

| 6,429,914 | B1 * | 8/2002 | Kubota | ................. G02F 1/1334 349/141 |
| 2003/0202140 | A1 * | 10/2003 | Liu | ................... G02F 1/133528 349/117 |
| 2005/0128402 | A1 | 6/2005 | Lee | |
| 2009/0174853 | A1 | 7/2009 | Stroemer et al. | |
| 2009/0195717 | A1 | 8/2009 | Kabe et al. | |
| 2017/0255067 | A1 * | 9/2017 | Ito | ..................... G02F 1/134363 |

FOREIGN PATENT DOCUMENTS

| JP | 2005173540 A | 6/2005 |
| JP | 20091963243 A | 7/2009 |
| JP | 2009181066 A | 8/2009 |

* cited by examiner

*Primary Examiner* — Lucy P Chien
(74) *Attorney, Agent, or Firm* — K&L Gates LLP

(57) ABSTRACT

According to one embodiment, a liquid crystal device includes a first substrate including a first electrode and a second electrode, a second substrate, a liquid crystal layer, and the second electrode is located on a side of the liquid crystal layer with respect to the first electrode and includes a first opening, the first opening is formed into a polygonal shape including a base portion and at least one projecting portion projecting from the base portion along a first direction, a width of the base portion along the first direction is greater than a width of the projecting portion along the first direction, and the liquid crystal layer exhibits transparency while no voltage being applied and scattering property while voltage being applied.

20 Claims, 20 Drawing Sheets

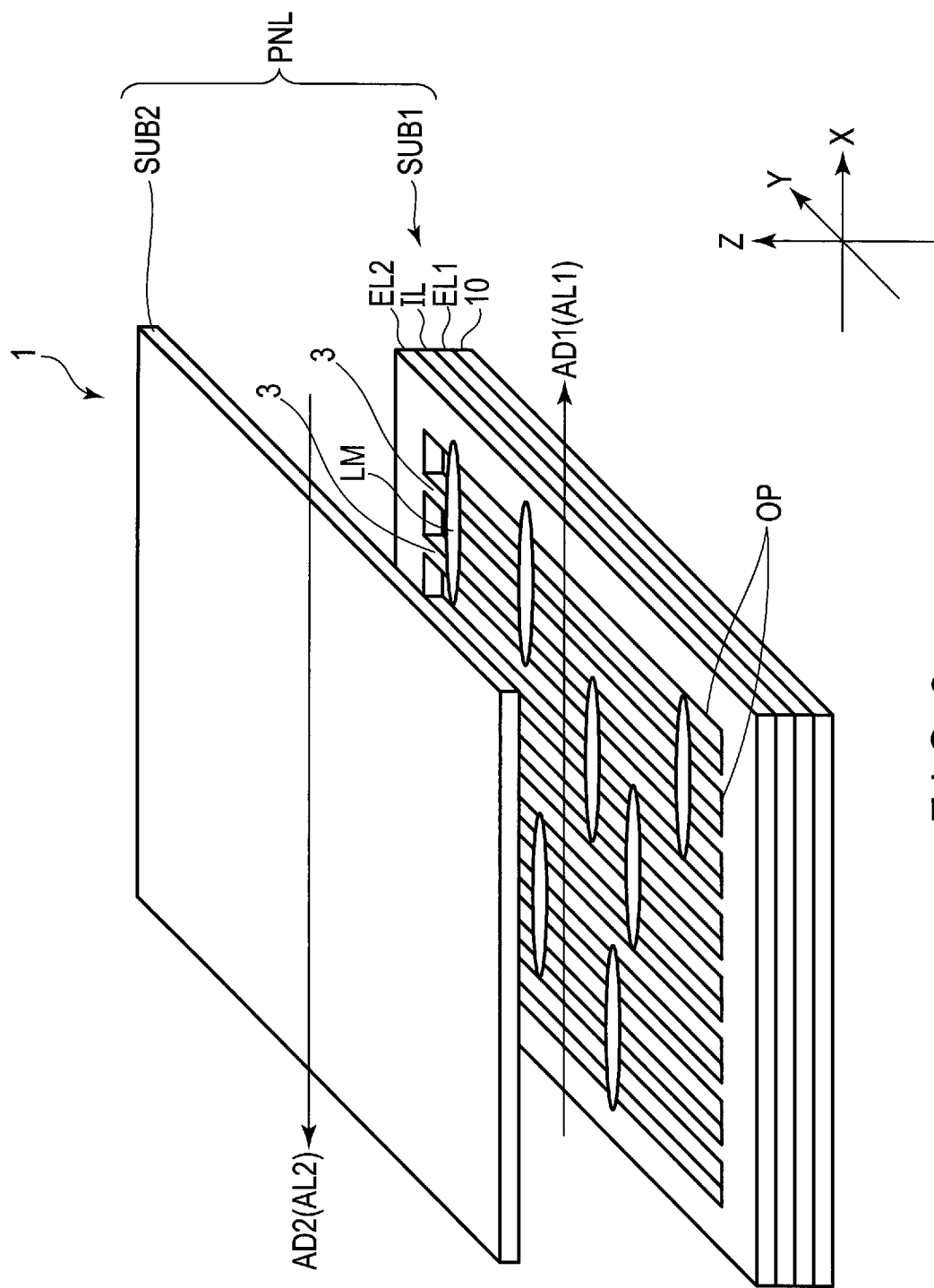
F I G. 2

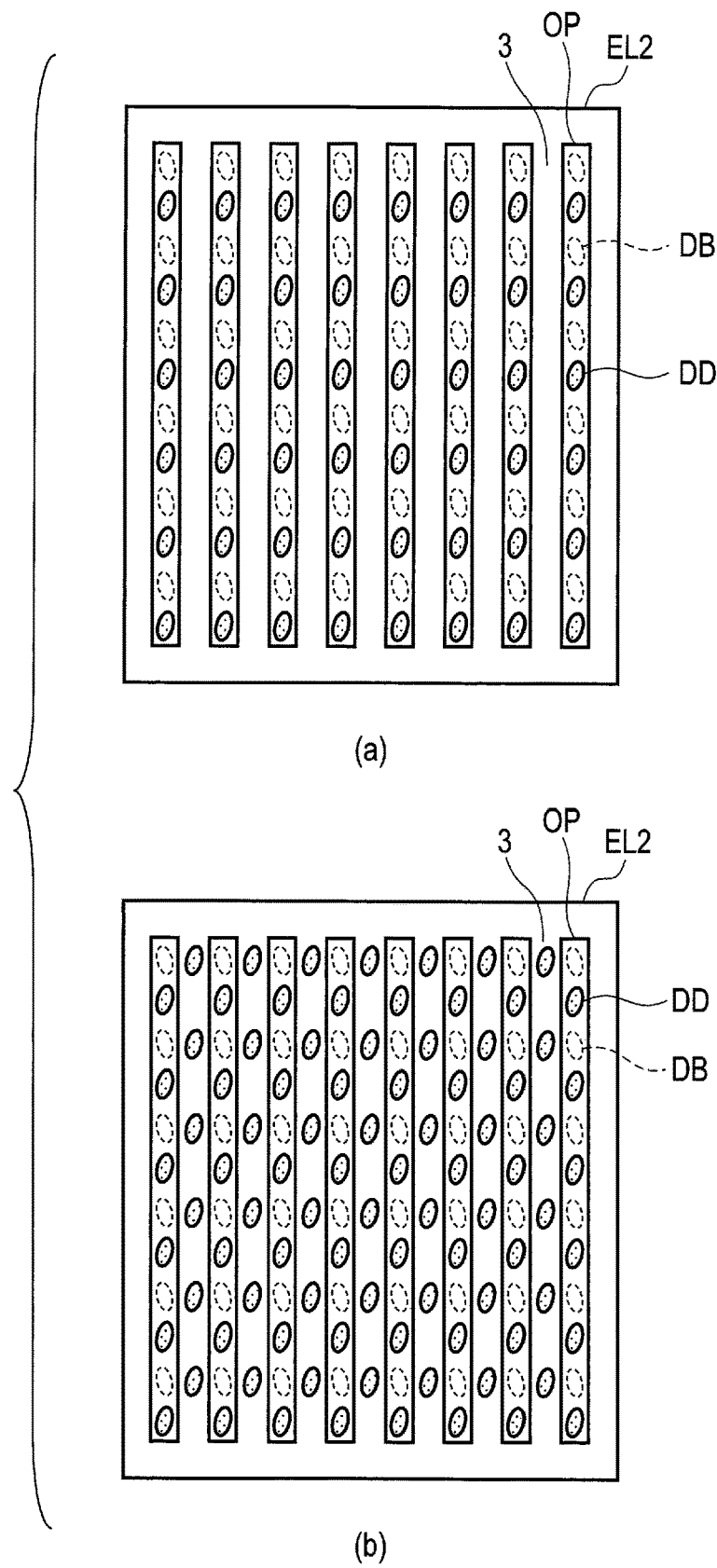
F I G. 3

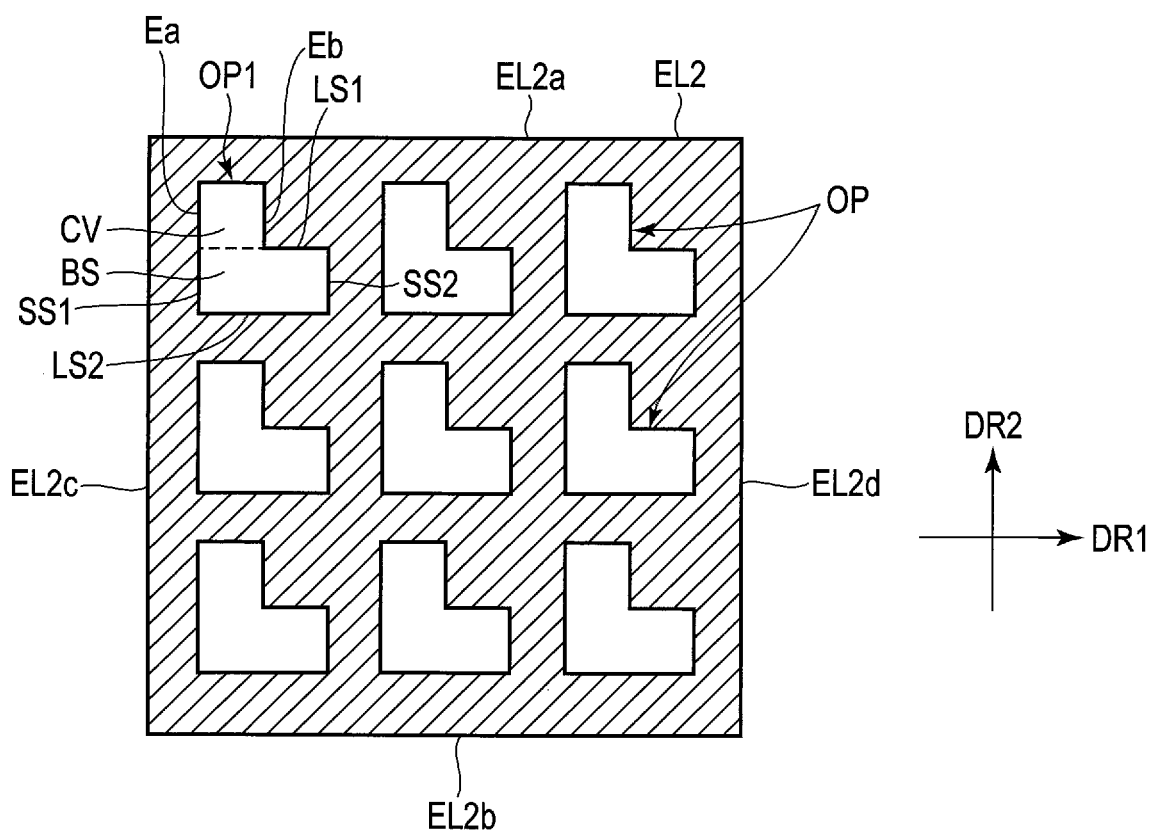
F I G. 4

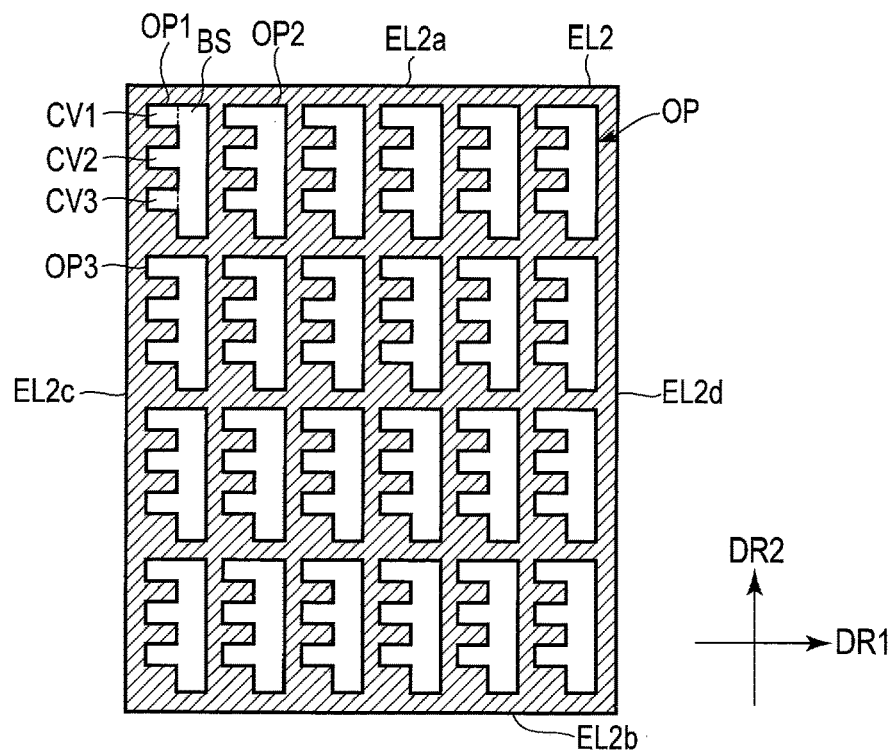
F I G. 5
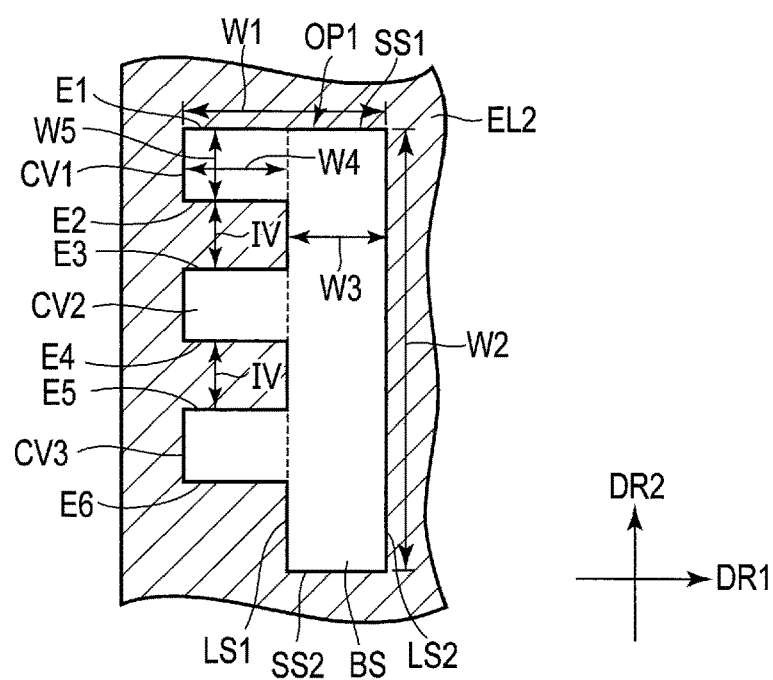
F I G. 6

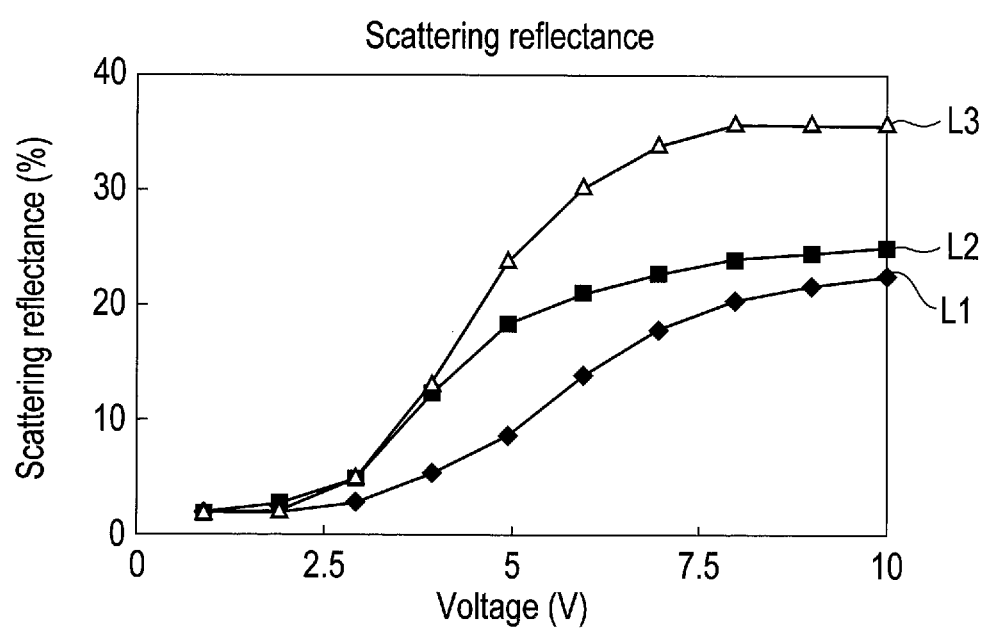
F I G. 7

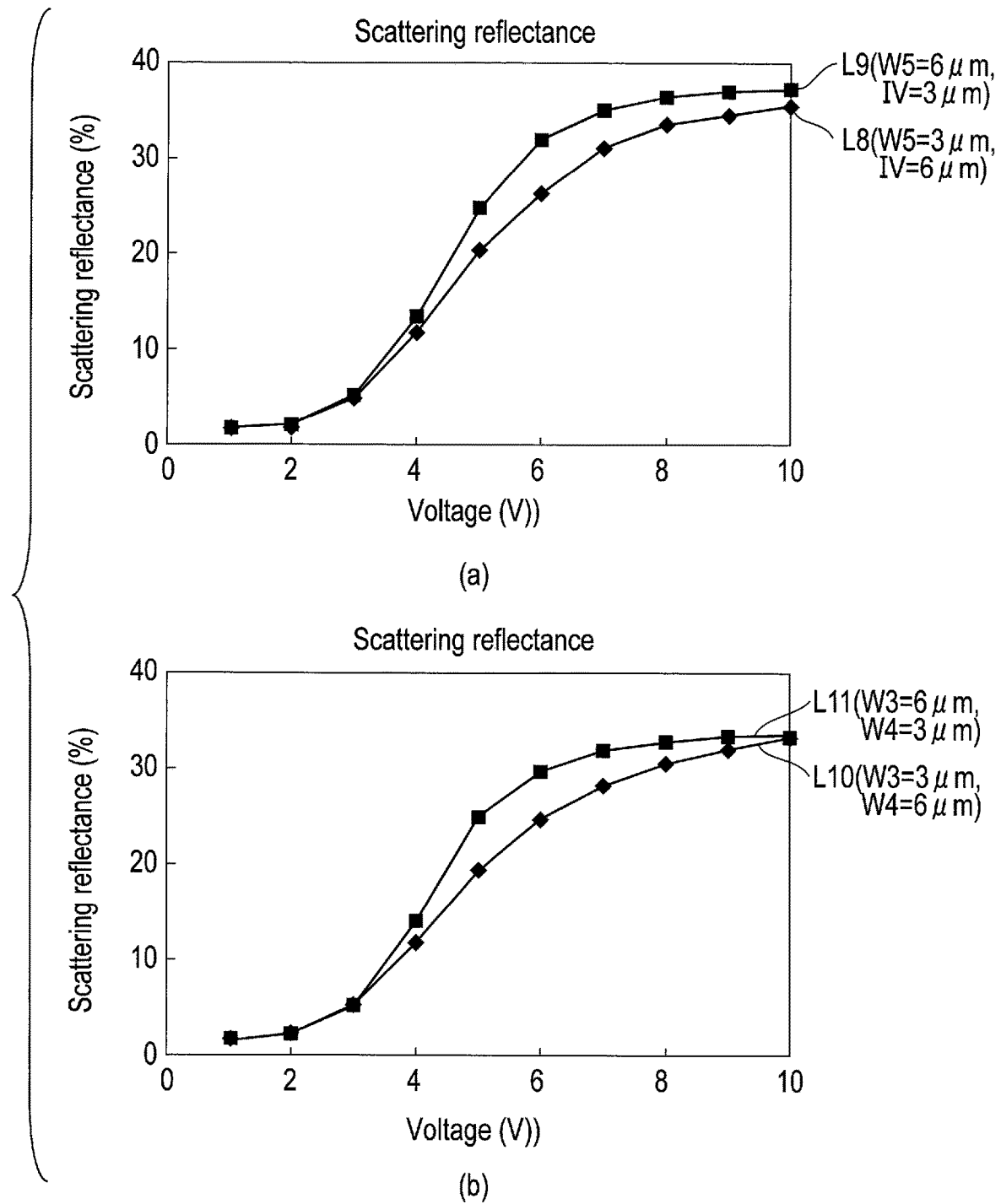
F I G. 9

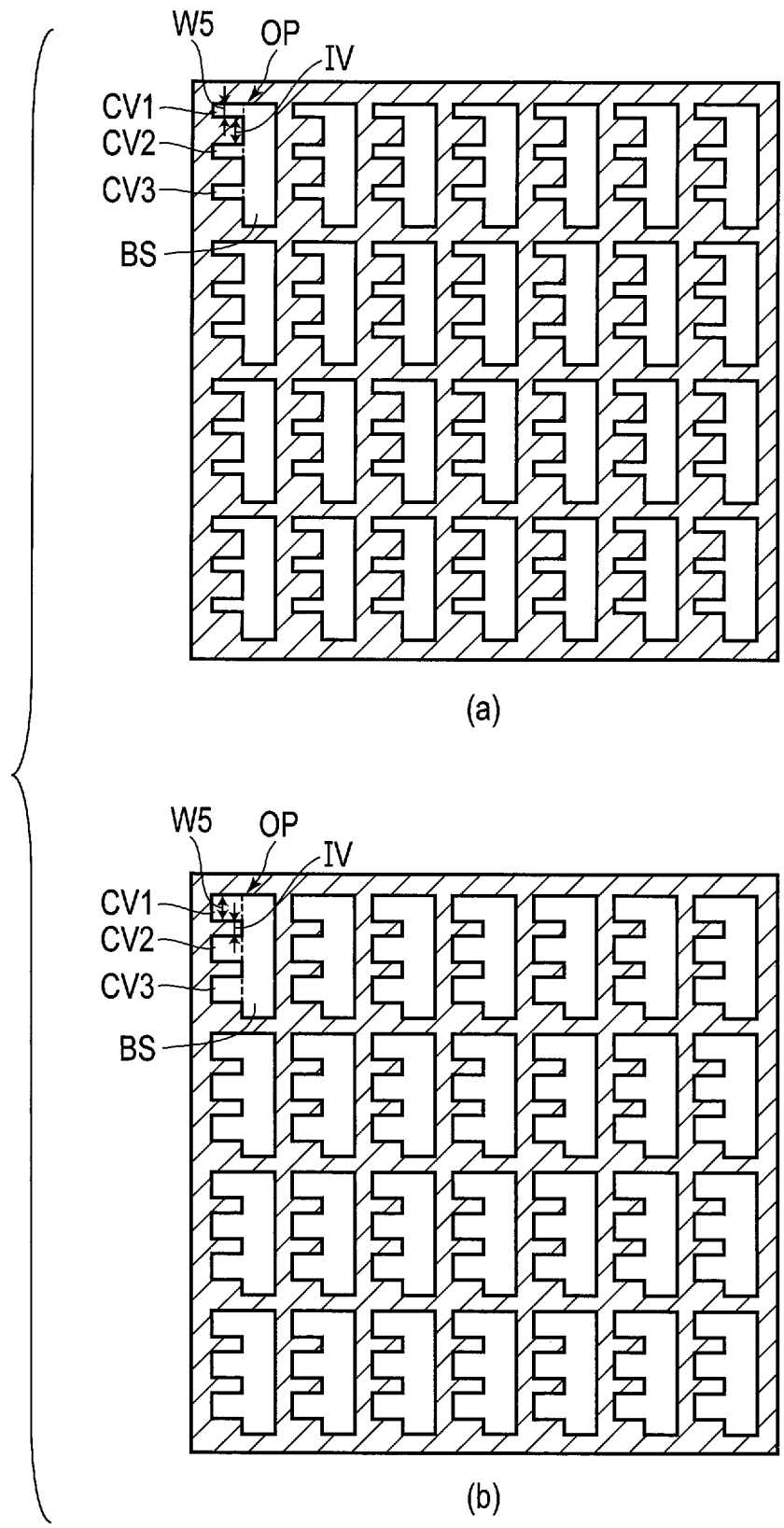
F I G. 11

(a)

(b)

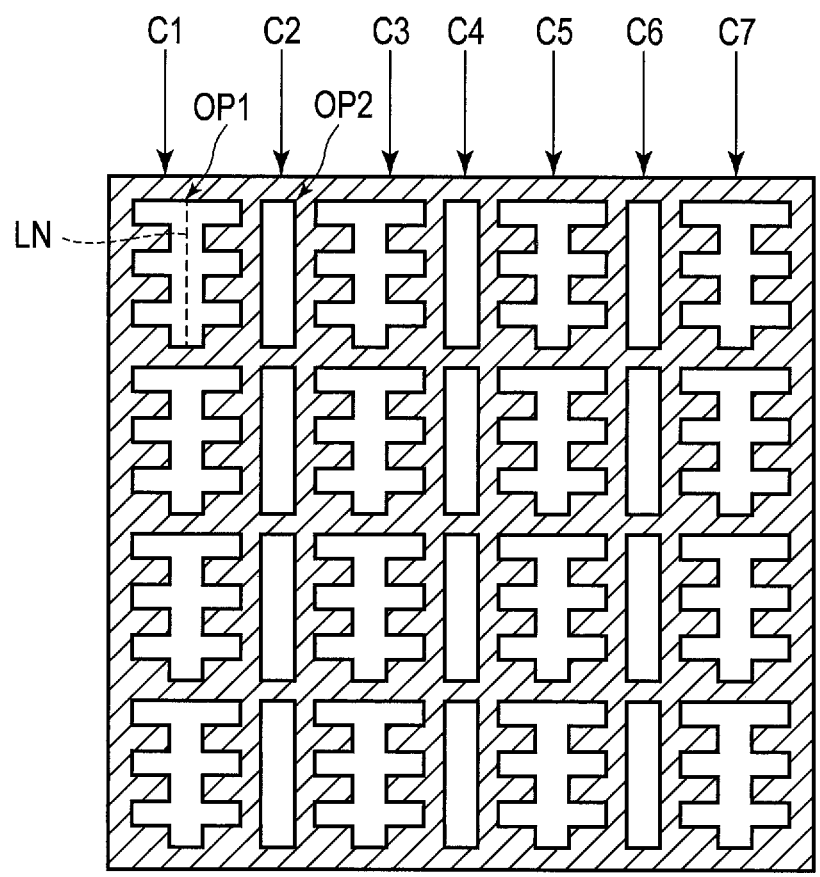
F I G. 15

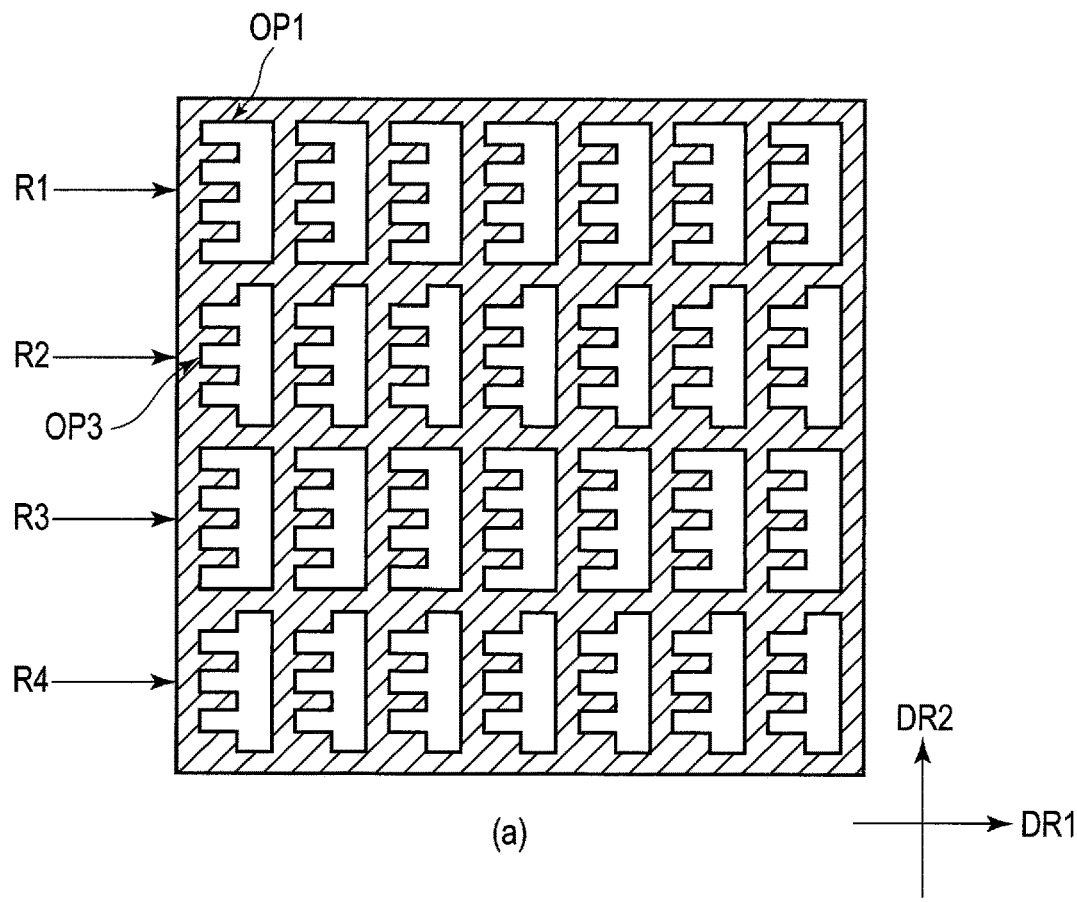
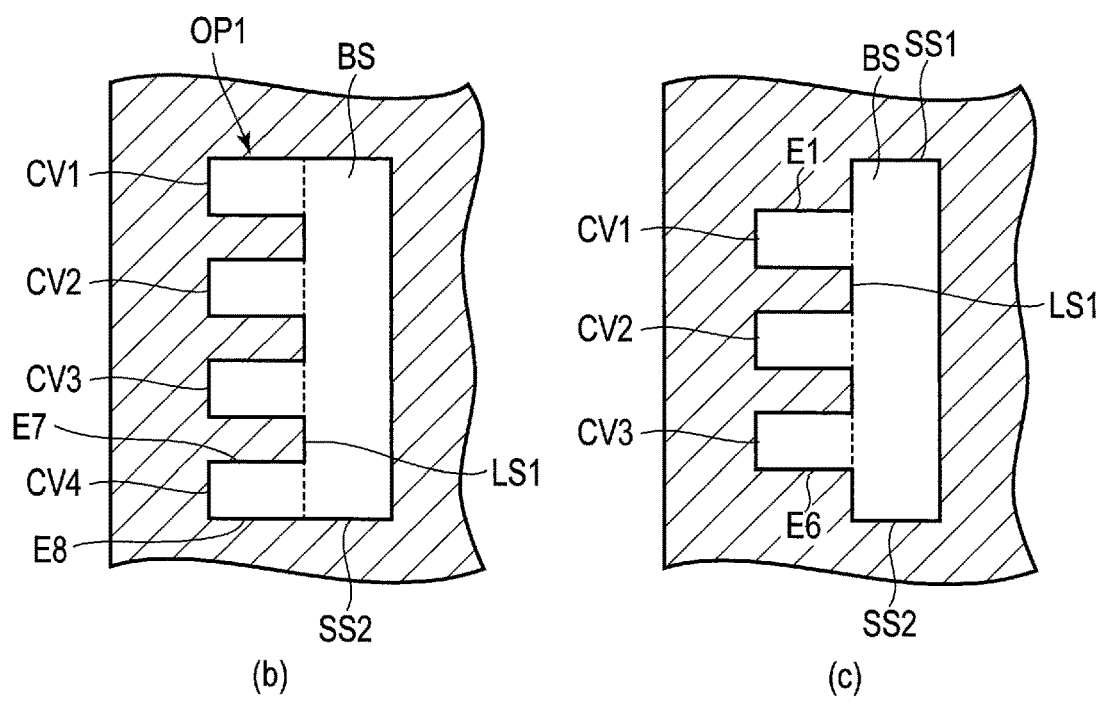
F I G. 16

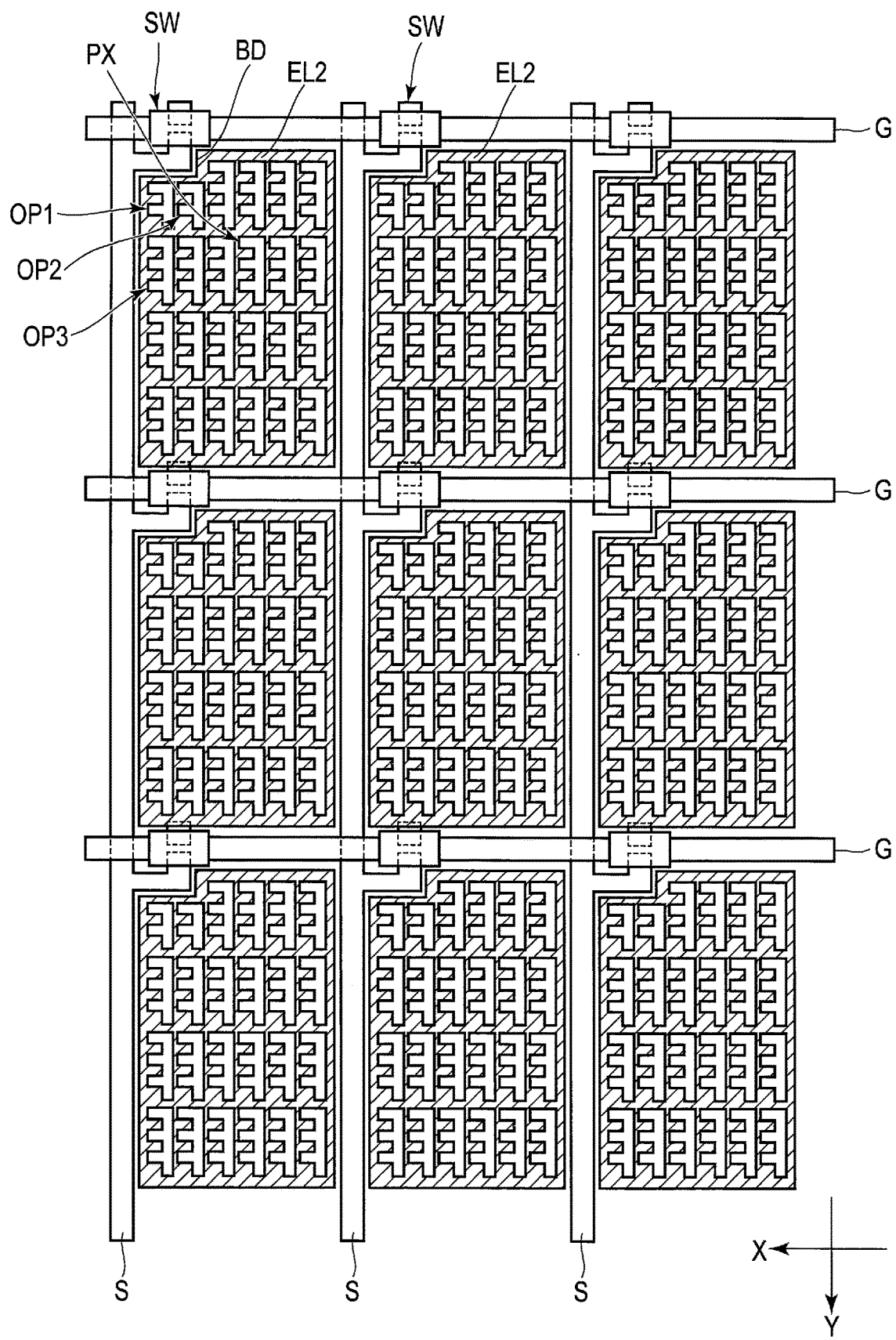
F I G. 21

LIQUID CRYSTAL DEVICE

CROSS-REFERENCE TO RELATED APPLICATIONS

This application is based upon and claims the benefit of priority from Japanese Patent Application No. 2016-217137, filed Nov. 7, 2016, the entire contents of which are incorporated herein by reference.

FIELD

Embodiments described herein relate generally to a liquid crystal device.

BACKGROUND

In recent years, scattering liquid crystal devices utilizing a lateral electric field, which can be driven at low voltage, have been proposed. Such scattering liquid crystal devices have a configuration which comprises, for example, a liquid crystal layer held between a pair of substrates, and an electrode, in the liquid crystal layer, which forms a lateral electric field parallel to the substrates. While the lateral electric field is not being formed, the liquid crystal layer exhibits a light transmission state, whereas while the lateral electric field being formed, the liquid crystal layer exhibits a light scattering state. The scattering liquid crystal devices do not require a polarizer, and therefore they can realize brighter display as compared to the liquid crystal devices comprising a polarizer.

SUMMARY

The present disclosure generally relates to a liquid crystal device.

According to one embodiment, a liquid crystal device includes a first substrate including a first electrode and a second electrode, a second substrate, a liquid crystal layer, and the second electrode is located on a side of the liquid crystal layer with respect to the first electrode and includes a first opening, the first opening is formed into a polygonal shape including a base portion and at least one projecting portion projecting from the base portion along a first direction, a width of the base portion along the first direction is greater than a width of the projecting portion along the first direction, and the liquid crystal layer exhibits transparency while no voltage being applied and scattering property while voltage being applied.

Additional features and advantages are described herein, and will be apparent from the following Detailed Description and the figures.

BRIEF DESCRIPTION OF THE DRAWINGS

FIG. 2 is a perspective view showing a configuration example of a liquid crystal device exhibiting transparency and scattering properties.

FIG. 3 is a plan view schematically showing the liquid crystal texture of the liquid crystal device shown in FIG. 2 when voltage is applied.

FIG. 4 is a plan view showing a configuration example of a second electrode of the liquid crystal device.

FIG. 5 is a plan view showing a configuration example of a second electrode of the liquid crystal device of this embodiment.

FIG. 6 is an enlargement of an opening shown in FIG. 5.

FIG. 7 is a diagram showing a change in scattering reflectance for each of three types of shapes of openings.

FIG. 9 is a diagram showing a change in scattering reflectance for the opening shown in FIG. 6.

FIG. 11 is a plan view showing another modified example of the second electrode of this embodiment.

FIG. 15 is a plan view showing another modified example of the second electrode of this embodiment.

FIG. 16 is a plan view showing another modified example of the second electrode of this embodiment.

FIG. 21 is a diagram showing locations of a second electrode and a switching element with relative to each other.

DETAILED DESCRIPTION

Figure 1:
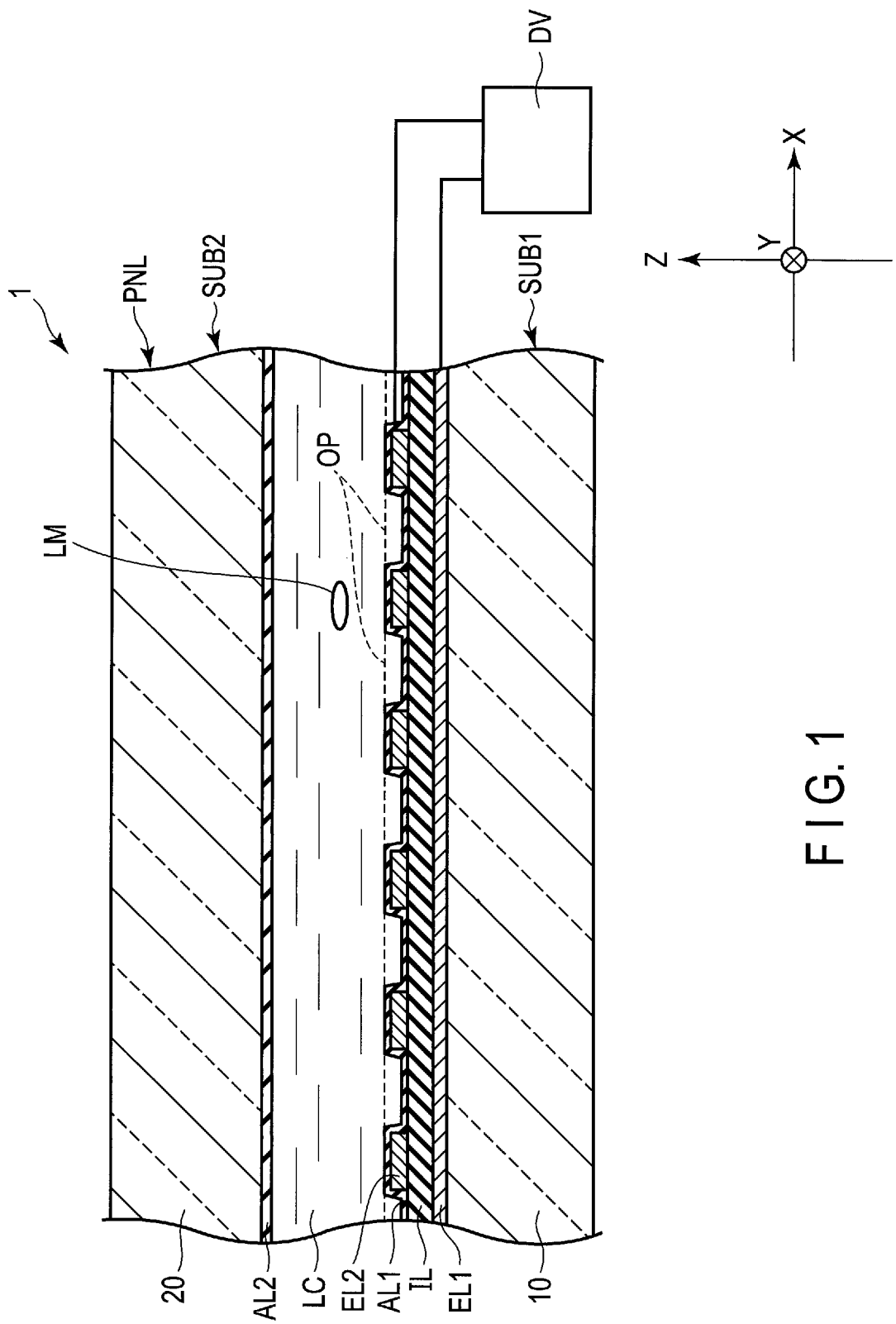
FIG. 1 is a cross section showing a configuration example of a liquid crystal device according to an embodiment.

In general, according to one embodiment, a liquid crystal device comprises a first substrate including a first electrode and a second electrode opposing the first electrode, a second substrate opposing the first substrate and a liquid crystal layer containing liquid crystal molecules and held between the first substrate and the second substrate, the second electrode being located on a side of the liquid crystal layer with respect to the first electrode and comprising a first opening, the first opening being formed into a polygonal shape comprising a base portion and at least one projecting portion projecting from the base portion along a first direction, a width of the base portion along the first direction is greater than a width of the projecting portion along the first direction, and the liquid crystal layer exhibiting transparency while no voltage being applied and scattering property while voltage being applied.

According to another embodiment, a liquid crystal device comprises a first substrate including a first electrode and a second electrode opposing the first electrode, a second substrate opposing the first substrate and a liquid crystal layer containing liquid crystal molecules and held between the first substrate and the second substrate, the second electrode being located on a side of the liquid crystal layer with respect to the first electrode and comprising a first opening, the first opening being formed into a polygonal shape comprising a base portion, and a first projecting portion and a second projecting portion projecting from the base portion along a first direction, the first projecting portion and the second projecting portion being arranged along a second direction crossing the first direction, a width of the first projecting portion along the second direction is greater than an interval between the first projecting portion and the second projecting portion along the second direction, and the liquid crystal layer exhibiting transparency while no voltage being applied and scattering property while voltage being applied.

According to yet another embodiment, a liquid crystal device comprises a first substrate including a first electrode and a second electrode opposing the first electrode, a second substrate opposing the first substrate and a liquid crystal layer containing liquid crystal molecules and held between the first substrate and the second substrate, the second electrode being located on a side of the liquid crystal layer with respect to the first electrode and comprising a first opening, the first opening being formed into a polygonal shape comprising a base portion, and a first projecting portion and a second projecting portion projecting from the base portion along a first direction, and the liquid crystal layer exhibiting transparency while no voltage being applied and scattering property while voltage being applied.

Embodiments will now be described with reference to accompanying drawings. Note that the disclosure is presented for the sake of exemplification, and any modified example and variation conceived within the scope and spirit of the invention by a person having ordinary skill in the art are naturally encompassed in the scope of invention of the present application. Furthermore, a width, thickness, shape, and the like of each element are depicted schematically in the figures as compared to actual embodiments for the sake of simpler explanation, and they do not limit the interpretation of the invention of the present application. Furthermore, in the description and figures of the present application, structural elements having the same or similar functions will be referred to by the same reference numbers and detailed explanations of them that are considered redundant may be omitted.

First, a liquid crystal device according to this embodiment will be described in detail.

FIG. 1 is a cross section showing a configuration of the liquid crystal device 1 according to this embodiment.

A display panel PNL comprises a first substrate SUB1, a second substrate SUB2 and a liquid crystal layer LC. The second substrate SUB2 opposes first substrate SUB1. The liquid crystal layer LC is held between the first substrate SUB1 and the second substrate SUB2, and contains liquid crystal molecules LM.

Here, a first direction X and a second direction Y are orthogonal to each other, and a third direction Z is orthogonal to the first direction X and the second direction Y. A positive direction of the third direction Z or a direction towards the second substrate SUB2 from the first substrate SUB1 is defined as up, and a negative direction of the third direction Z or a direction towards the first substrate SUB1 from the second substrate SUB2 is defined as down.

The first substrate SUB1 comprises a first insulating substrate 10, a first electrode EL1, an interlayer insulating film IL, a second electrode EL2 and a first alignment film AL1.

The first insulating substrate 10 is a light-transmissive substrate such as a glass or resin substrate.

The first electrode EL1 is located on the first insulating substrate 10. Note here that such an expression as "located on" used in this specification covers both cases that a member contacts as well or does not directly contact another member. The first electrode EL1 is a transparent conductive layer formed from a transparent conductive material, for example, indium tin oxide (ITO) or indium zinc oxide (IZO).

The interlayer insulating film IL is located on the first electrode EL1. The interlayer insulating film IL is formed from an inorganic system material, for example, silicon oxide or silicon nitride.

The second electrode EL2 is located on the interlayer insulating film IL. The second electrode EL2 comprises an opening OP indicated by a dashed line in the drawing. The second electrode EL2 opposes the first electrode EL1 and is located on a liquid crystal layer LC side with respect to the first electrode EL1. The second electrode EL2 is a transparent conductive layer formed from a transparent conductive material, for example, ITO or IZO.

The first alignment film AL1 covers the second electrode EL2, and also is in contact with the interlayer insulating film IL in the opening OP.

The second substrate SUB2 comprises a second insulating substrate 20 and a second alignment film AL2. The second insulating substrate 20 is a light-transmissive substrate such as a glass or resin substrate. The second alignment film AL2 covers the second insulating substrate 20.

A driver DV is electrically connected to the first electrode EL1 and the second electrode EL2 to apply voltage between the first electrode EL1 and the second electrode EL2. The display panel PNL of this embodiment includes both of the first electrode EL1 and the second electrode EL2 within the first substrate SUB1. When voltage is applied to the first electrode EL1 and the second electrode EL2 from the driver DV, the lateral electric field along a main surface of the substrate is produced between these electrodes. The main surface of the substrate is parallel to an X-Y plane defined by the first direction X and the second direction Y.

When, for example, no voltage is being applied between the first electrode EL1 and the second electrode EL2 (no voltage application period), the display panel PNL transmits light from a lower surface side of the first substrate SUB1 to an upper surface side of the second substrate SUB2, and also transmits light from the upper surface side of the second substrate SUB2 to the lower surface side of the first substrate SUB1. On the other hand, when voltage is being applied between the first electrode EL1 and the second electrode EL2 (voltage application period), the display panel PNL scatters light from the lower surface side of the first substrate SUB1 towards the upper surface side of the second substrate SUB2, and the light from the upper surface side of the second substrate SUB2 towards the lower surface side of the first substrate SUB1. Here, a surface of the first substrate SUB1 on a lower side is defined as the lower surface, and the surface of the second substrate SUB2 on an upper side is defined as the upper surface.

As will be described later, the display panel PNL may comprise a reflective layer. In the example shown in FIG. 1, the first electrode EL1 may be formed as a reflective layer, and the second electrode EL2 may be formed as a transparent conductive layer. In this case, the first electrode EL1 is formed from, for example, a highly reflective metal material such as aluminum or silver. Thus, when the first electrode EL1 is formed as a reflective layer, it is no longer necessary to provide a separate reflective layer, making it possible to reduce the number of manufacturing steps.

As illustrated, the liquid crystal device 1 of this embodiment does not comprise a polarizer on either side of the lower surface of the first substrate SUB1 or the upper surface of the second substrate SUB2.

FIG. 2 is a perspective view showing a configuration example of the liquid crystal device 1 exhibiting transparency and scattering property. Note that the shape of the second electrode EL2 shown in FIG. 2 is a comparative example to that of the second electrode EL2 of this embodiment.

As shown in FIG. 2, the second electrode EL2 comprises a plurality of openings OP and belt-like electrode portions 3. More specifically, the openings OP and the electrode portions 3 are each formed into a rectangular shape in the X-Y plane, and long sides of each opening OP extend along the second direction Y. The openings OP and the electrode portions 3 are arranged alternately along the first direction X.

The first alignment film AL1 and the second alignment film AL2 are subjected to aligning process (for example, rubbing treatment or optical alignment) to be aligned parallel to each other with respect to the X-Y plane. The first alignment film AL1 and the second alignment film AL2 have alignment directions AD1 and AD2, respectively, along a direction orthogonal to the long sides of the openings OP. In the example illustrated, the alignment directions AD1 and AD2 are along the first direction X. Further, the alignment directions AD1 and AD2 are opposite to each other. The alignment directions referred to here correspond to directions along which the liquid crystal molecules LM are aligned by alignment restriction force of the first alignment films AL1 and AL2 while no voltage being applied. Note that when the liquid crystal molecules LM are pre-tilted, the alignment direction is defined as a direction in which the long axes of the liquid crystal molecules LM are orthogonally projected to the X-Y plane.

The operation of the liquid crystal device with the above-described configuration will now be described.

The following explanation is based on an assumption that the liquid crystal molecules LM having positive dielectric anisotropy (positive type) are sealed between the first substrate SUB1 and the second substrate SUB2.

While no voltage being applied, no electric field is formed between the first electrode EL1 and the second electrode EL2. Therefore, as shown in FIG. 2, the liquid crystal molecules LM contained in the liquid crystal layer are initially aligned along the first direction X, which is the same as the alignment directions AD1 and AD2 of the first alignment film AL1 and the second alignment film AL2 in the X-Y plane.

On the other hand, while voltage is being applied, a lateral electric field is produced between the first electrode EL1 and the second electrode EL2. Here, the lateral electric field produced is orthogonal to the long sides of the openings OP in the X-Y plane. That is, the direction of the lateral electric field produced while voltage being applied is parallel to the direction of the initial alignment of the liquid crystal molecules LM while no voltage being applied.

Note that when the liquid crystal molecules LM having negative dielectric constant anisotropy (negative type) are sealed, the alignment directions AD1 and AD2 are set to a direction parallel to the long sides of the openings OP.

The liquid crystal molecules LM of the liquid crystal device 1 configured as above while voltage being applied behave as follows.

FIG. 3 is a plan view schematically showing the liquid crystal texture while voltage being applied in the liquid crystal device 1 shown in FIG. 2.

To the first electrode EL1 and the second electrode EL2 of the liquid crystal device 1, 60 Hz-alternating voltage of square wave was applied while increasing stepwise to an amplitude of 10V. To make observation easier, the liquid crystal device 1 was inserted between polarizers of crossed-Nicol arrangement and observed under microscope in the state where the angle made between a transmission axis of one of the polarizers and the direction of the initial alignment was 20 degrees.

FIG. 3, part (a) is a schematic diagram showing a result of the polarized microscopic observation when the applied voltage was 3V, and FIG. 3, part (b) is a schematic diagram showing a result of the polarized microscopic observation when the applied voltage was 3.5V. Up to when the amplitude of the applied voltage was 2.5V, no significant change remarkable appeared in the alignment of the liquid crystal molecules LM. When the amplitude of the applied voltage became 3V, as shown in FIG. 3, part (a), a plurality of domains began to appear in the openings OP. The domains are arranged along the openings OP of the second electrode EL2, and domains DD, which are those in which the boundaries are clear, but the regions within the boundaries are comparatively, and domains DB, which are those in which the boundaries are unclear, but the regions within the boundaries are comparatively bright appear alternately. Further, when the amplitude of the applied voltage became 3.5V, as shown in FIG. 3, part (b), a plurality of similar domains began to appear on the electrode portions 3 of the second electrode. Then, when the amplitude of the applied voltage was raised to 5V, the scattering intensity increased although no significant change appeared in the domains. From the observation of a plurality of minute domains produced, it has been found that the boundaries are made between domains by refractive index, thus scattering the light intensively.

As described, by constituting the liquid crystal device 1 as above, such scattering state in which the liquid crystal layer scatters light strongly while voltage is being applied can be achieved. In other words, the liquid crystal layer exhibits transparency while no voltage being applied, whereas exhibits scattering property when a voltage of a certain level or higher being applied.

FIG. 4 is a plan view showing a configuration example of the second electrode EL2 of the liquid crystal device 1. Note that the shape of the second electrode EL2 shown in FIG. 4 is a comparative example to the second electrode EL2 of this embodiment.

Here, the directions DR1 and DR2 are orthogonal to each other. For example, the second electrode EL2 may be arranged so that the direction DR1 corresponds to the first direction X and the second direction DR2 corresponds to the second direction Y, or the direction DR1 corresponds to the second direction Y and the direction DR2 corresponds to the first direction X.

As illustrated, the second electrode EL2 is formed into a rectangular shape. The second electrode EL2 comprises a side EL2a and a side EL2b along the direction DR1, and a side EL2c and a side EL2d along the direction DR2. The side EL2a and the side EL2b oppose each other along the direction DR2. The side EL2c and the side EL2d oppose each other along the direction DR1.

The second electrode EL2 comprises a plurality of openings OP. In the example illustrated, the second electrode EL2 comprises nine openings OP. The nine openings OP are arranged in three rows and three columns. Note that the number or the layout of the opening OP are not limited to that of the illustrated example. The openings OP are identically each formed into an L shape.

These openings OP are formed into an identical shape, and the shape thereof will be described by focusing one opening OP1. The opening OP1 is formed into a polygonal shape consisting of a rectangular base portion BS, a projecting portion CV projecting in a direction of the arrow of the direction DR2 from the base portion BS. As shown in FIG. 4, the base portion BS comprises two long sides LS1 and LS2 and two short sides SS1 and SS2. The long sides LS1 and LS2 are parallel to the direction DR1, and the short sides SS1 and SS2 are parallel to the direction DR2. Further, the projecting portion CV is formed into a rectangular shape. The projecting portion CV comprises two sides Ea and Eb parallel to the direction DR2.

In the example shown in FIG. 4, when each of the openings OP are viewed along the direction DR2, the projecting portion CV is located on a side of the side EL2a of the second electrode EL2 with regard to the base portion BS, and the long side LS2 is located on a side of the side EL2b of the second electrode EL2. On the other hand, when viewed along the direction DR1, the short side SS1 and the side Ea are located on a side of the side EL2c of the second electrode EL2, and the short side SS2 is located on a side of the side EL2d of the second electrode EL2. In other words, the openings OP are arranged in the same direction.

Here, the alignment directions AD1 and AD2 shown in FIG. 2 are parallel to, for example, the direction DR1. The initial alignment direction of the liquid crystal molecules LM while no voltage being applied is parallel to the direction DR1, and thus parallel to the long sides LS1 and LS2 and the like, and orthogonal to the short sides SS1 and SS2 and the sides Ea and Eb. That is, the openings OP1 comprises sides parallel to the initial alignment direction of the liquid crystal molecules while no voltage being applied, and also sides orthogonal to the initial alignment direction.

In a liquid crystal device 1 in which the second electrode EL2 comprise openings OP of such a shape as shown in FIG. 4, the liquid crystal layer exhibits transparency while no voltage being applied and scattering property while a voltage of a certain level or higher being applied as in the case of the configuration example described above. Here, the voltage of a certain level or higher more is 4V, for example.

Next, a configuration example of the second electrode EL2 applied to the liquid crystal device of this embodiment will be described.

FIG. 5 is a plan view showing a configuration example of a second electrode EL2 of the liquid crystal device 1 according to this embodiment. Further, FIG. 6 is an enlarge view of an opening OP1 shown in FIG. 5.

The second electrode EL2 comprises a plurality of openings OP. In the example illustrated, the second electrode EL2 comprises twenty four openings OP. The twenty four openings OP are arranged in six rows and four columns. The openings OP are each formed into an identical shape. In the example illustrated, the second electrode EL2 comprises an opening OP2 adjacent to the opening OP1 along the direction DR1 and an opening OP3 which adjacent thereto along the direction DR2. As described above, the openings OP1, OP2 and OP3 are formed into an identical shape.

The openings OP are formed into an identical shape and therefore the shape thereof will be described by focusing one opening OP1. The opening OP1 is formed into a polygonal shape consisting of a rectangular base portion BS and three projecting portions CV1, CV2 and CV3 projecting in a direction opposite to the arrow of the direction DR1 from the base portion BS. The projecting portions CV1, CV2 and CV3 are each formed into a rectangular shape, and they are arranged in this order in an opposite direction to the arrow of the direction DR2.

As shown in FIG. 6, the base portion BS comprises two long sides LS1 and LS2 and two short sides SS1 and SS2. The long sides LS1 and LS2 are parallel to the direction DR2, and the short sides SS1 and SS2 are parallel to the direction DR1. The projecting portion CV1 comprises two sides E1 and E2 parallel to the direction DR1. The sides E1 and E2 oppose to each other along the direction DR2. The projecting portion CV2 comprises two sides E3 and E4 parallel to the direction DR1. The sides E3 and E4 oppose each other along the direction DR2. The projecting portion CV3 comprises two sides E5 and E6 parallel to the direction DR1. The sides E5 and E6 oppose each other along the direction DR2.

The opening OP1 has a width W1 along the direction DR1 and a width W2 along the direction DR2. The width W1 is equivalent to a total of a length of the short side SS1 and a length of the side E1. The width W2 is equivalent to a length of the long side LS2. In this embodiment, the width W2 is, for example, equal to or no more than three times the width W1, and should desirably be about two times. In this embodiment, the width W1 is, for example, 10 μm to 15 μm, and desirably, 12 μm. Further, the width W2 is, for example, 15 μm to 30 μm, and desirably 24 μm.

The base portion BS has a width W3 along the direction DR1. The width W3 is equivalent to an interval between the long sides LS1 and LS2 along the direction DR1. The projecting portions CV1, CV2 and CV3 have the same width W4 along the direction DR1. A total of the widths W3 and W4 is equal to the width W1. For example, the width W3 is greater than the width W4. Further, the projecting portions CV1, CV2 and CV3 each have a width W5 along the direction DR2. For example, the width W5 is equivalent to an interval between the sides E1 and E2 along the direction DR2. The interval between the projecting portions CV1 and CV2 along the direction DR2 is equal to that between the projecting portions CV2 and CV3 along the direction DR2, which are each defined as an interval IV. That is, the projecting portions CV1, CV2 and CV3 are arranged at equal intervals along the direction DR2. For example, the interval IV is equivalent to the interval between the sides E2 and E3 along the direction DR2, or the interval between the sides E4 and E5 along the direction DR2. For example, the width W5 is greater than the interval IV. A total of the width W5 of each of the projecting portions CV1, CV2 and CV3, the interval IV between the projecting portions CV1 and the interval IV between the projecting portions CV2 and CV3 is smaller than the width W2.

The side E1 of the projecting portion CV1 is located on the same straight line as the short side SS1 of the base portion BS. The sides E2, E3 and E4 and the sides E5 and E6 cross the long side LS1. The side E6 is not located on the same straight line as the short side SS2. In the example illustrated, the sides E1 to E6 each orthogonally cross the long side LS1, but they may cross at an angle other than 90 degrees. Further, each of the sides E1 to E6 and the long side LS1 may be connected via a curved side.

In the example shown in FIG. 5, when each of the openings OP is viewed along the direction DR1, the projecting portion CV1, CV2 and CV3 are located on a side of the side EL2c of the second electrode EL2 with regard to the base portion BS, and the long side LS2 is located on a side of the side EL2d of the second electrode EL2. Further, when each of the openings OP is viewed along the direction DR2, the short side SS1 and the side E1 are located on a side of the side EL2a of the second electrode EL2, and the short side SS2 is located on a side of the side EL2b of the second electrode EL2. That is, the openings OP are arranged in the same direction.

Here, the alignment directions AD1 and AD2 shown in FIG. 2 are parallel to, for example, the direction DR1. The initial alignment direction of the liquid crystal molecules LM while no voltage being applied is parallel to the direction DR1, and also parallel to the short sides SS1 and SS2 and the sides E1 to E6, and orthogonal to the long sides LS1 and LS2, and the like. That is, the openings OP1 involve sides parallel to the initial alignment direction of the liquid crystal molecules while no voltage being applied, and sides orthogonal to the initial alignment direction.

In the liquid crystal device 1 in which the second electrode EL2 comprises the openings OP having such a shape as shown in FIGS. 5 and 6, the liquid crystal layer exhibits transparency while no voltage being applied, and scattering property while a voltage having a certain level or higher being applied as in the configuration example described above. In the example illustrated, the opening OP1 comprises three projecting portions CV1, CV2 and CV3, but the number of projecting portions is not limited to this. For example, the opening OP1 may comprise one or two projecting portions, or four or more projecting portions.

FIG. 7 is a diagram showing a change in scattering reflectance for each of three kinds of shapes of openings.

In the diagram, the horizontal axis indicates voltage (V) applied to the liquid crystal device in a range from 0 to 10V. The value of the voltage indicates the absolute value of the amplitude of the voltage. The vertical axis indicates the scattering reflectance. The value of the scattering reflectance expresses the ratio when the scattering reflectance of a perfect white is set to 100.

A line L1 in the diagram indicates the scattering reflectance to the voltage value of the liquid crystal device when using the second electrode EL2 whose openings OP have a rectangular shape as shown in FIG. 2. A line L2 in the diagram indicates the scattering reflectance to the voltage value of the liquid crystal device when using the second electrode EL2 whose openings OP have an L shape as shown in FIG. 4. A line L3 in the diagram indicates the scattering reflectance to the voltage value of the liquid crystal device when using the second electrode EL2 whose openings OP comprising three projecting portions CV1, CV2 and CV3 as shown in FIGS. 5 and 6.

As illustrated, when each of the lines L1, L2 and L3 is analyzed, it has been found that the scattering reflectance increases around from when the voltage (V) exceeded about 3V, and the scattering reflectance increased abruptly around from when the voltage (V) exceeded about 4V. Moreover, when the lines L1, L2 and L3 are compared with each other, when the voltages (V) are the same as each other and equal to or higher than 4V, the scattering reflectance of the line L2 is higher than the scattering reflectance of the line L1 and also the scattering reflectance of the line L3 is higher than the scattering reflectance of the line L2. From this comparison between the lines L1 and L2, it has been confirmed that the scattering reflectance to the same voltage value is higher when the openings OP are formed into an L shape, than in the configuration example in which the openings OP of the second electrode EL2 are formed into a rectangular shape. Further, from the comparison between the lines L2 and L3, it has been confirmed that the scattering reflectance to the same voltage value is higher in this embodiment where the openings OP are each formed into a polygon comprising three projecting portions than in the case where the openings OP of the second electrode EL2 are formed into an L shape.

Figure 8:
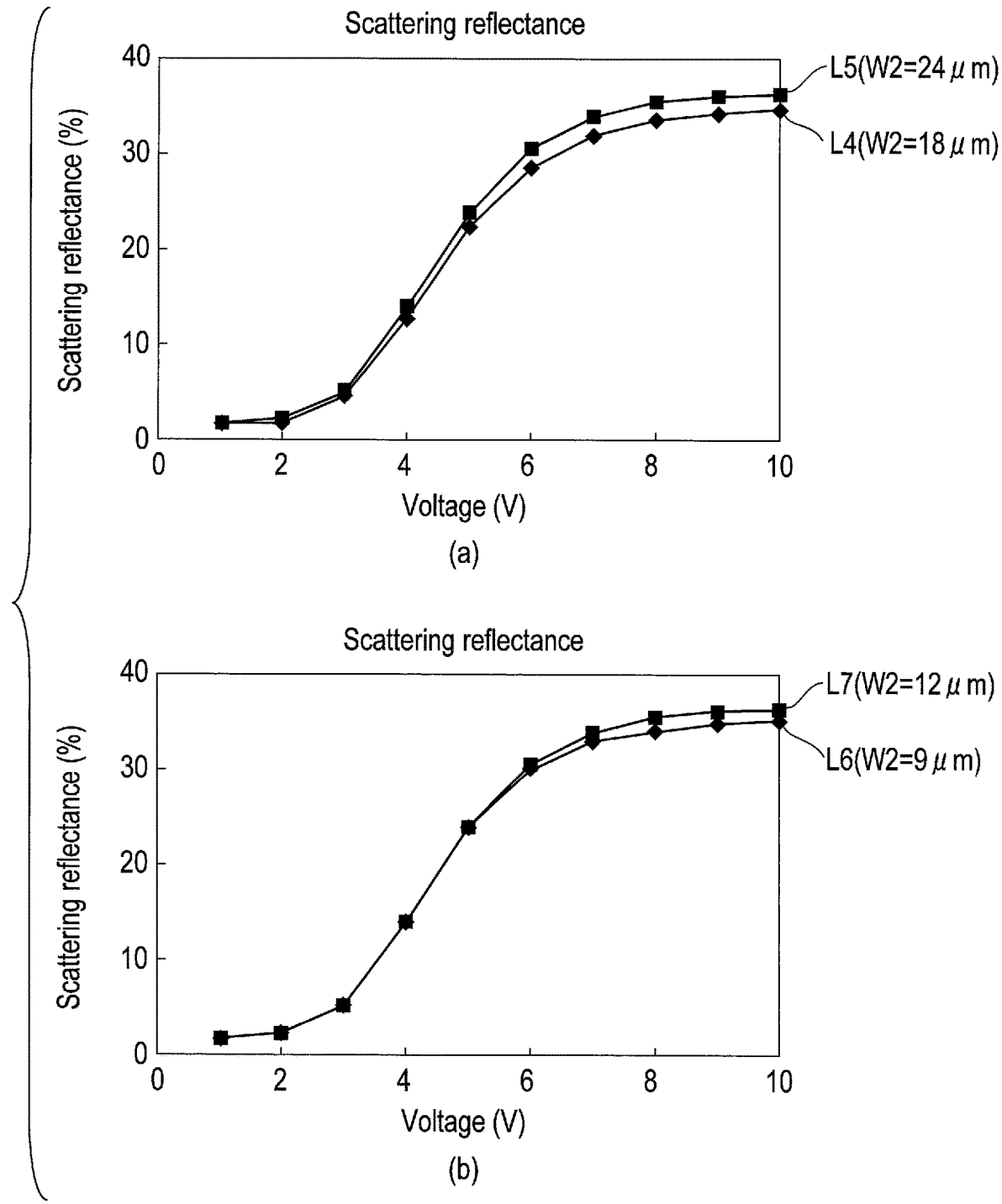
FIG. 8 is a diagram showing a change in scattering reflectance for the opening shown in FIG. 6.

FIG. 8 is a diagram showing a change in scattering reflectance of the opening OP1 shown in FIG. 6. FIG. 8, part (a) is a diagram showing the relationship between the width W2 of the opening OP1 shown in FIG. 6 and the scattering reflectance. In the diagram, a line L4 indicates the scattering reflectance of the liquid crystal device to the voltage value when the width W2 is 18 μm. A line L5 indicates the scattering reflectance of the liquid crystal device to the voltage value when the width W2 is 24 μm. As can be seen from the comparison between the lines L4 and L5, the scattering reflectance of the line L5 is higher than the scattering reflectance of the line L4 when the voltage (V) is equal. Thus, it has been confirmed that the scattering reflectance, if the voltage value is equal, is higher when W2 is 24 μm than when W2 is 18 μm.

FIG. 8, part (b) is a diagram showing the relationship between the width W1 of the opening OP1 shown in FIG. 6 and the scattering reflectance. In the diagram, a line L6 indicates the scattering reflectance of the liquid crystal device to the voltage value when the width W1 is 9 μm. A line L7 indicates the scattering reflectance of the liquid crystal device to the voltage value when the width W1 is 12 μm. As can be seen from the comparison between the lines L6 and L7, the scattering reflectance of the line L7 is higher than the scattering reflectance of the line L6 when the voltage (V) is equal. Thus, it has been confirmed that the scattering reflectance, if the voltage (V) is equal, is higher when W2 is 12 μm than when W1 is 9 μm.

FIG. 9 is a diagram showing a change in scattering reflectance for the opening OP1 shown in FIG. 6. FIG. 9, part (a) is a diagram showing the relationship between the width W5 and the interval IV of the opening OP1 shown in FIG. 6 and the scattering reflectance. In the diagram, a line L8 indicates the scattering reflectance of the liquid crystal device to the voltage value when the width W5 is 3 μm and the interval IV is 6 μm. A line L9 indicates the scattering reflectance of the liquid crystal device to the voltage value when the width W5 is 6 μm and the interval IV is 3 μm. As seen from the comparison between the lines L8 and L9, the scattering reflectance of the line L9, if the voltage (V) is equal, is higher than the scattering reflectance of the line L8. Thus, it has been confirmed that the scattering reflectance is higher when the width W5 is greater than the interval IV than when the width W5 is less than the interval IV if the voltage value is equal.

FIG. 9, part (b) is a diagram showing the relationship between the width W3 and the width W4 of the opening OP1 shown in FIG. 6 and the scattering reflectance. In the diagram, a line L10 indicates the scattering reflectance of the liquid crystal device to the voltage value when the width W3 is 3 μm and the width W4 is 6 μm. A line L11 indicates the scattering reflectance of the liquid crystal device to the voltage value when the width W3 is 6 μm and the width W4 is 3 μm. As seen from the comparison between the lines L10 and L11, the scattering reflectance of the line L11, if the voltage (V) is equal, is higher than the scattering reflectance of the line L10. Thus, it has been confirmed that the scattering reflectance is higher when the width W3 is greater than the width W4 than when the width W3 is less than the width W4 if the voltage value is equal.

According to this embodiment, the liquid crystal device 1 comprises the first electrode EL1 and the second electrode EL2 comprising a plurality of openings OP on the first substrate SUB1. The liquid crystal layer LC exhibits scattering property while a voltage of a certain level or higher is being applied to the first electrode EL1 and the second electrode EL2 (voltage application period) and exhibits transparency while no voltage is being applied to the first and second electrodes (no voltage application period).

Further, the openings OP are each formed into a polygonal shape including projecting portions. Further, the openings OP involve sides parallel to the initial alignment direction and sides orthogonal to the initial alignment direction. The electric field to align the liquid crystal molecules LM is formed in a direction orthogonal to each side. Therefore, if the voltage exceeding the level of the usual range (for example, about 5V) is applied, a plurality of minute domains in which the liquid crystal molecules LM are aligned in various directions are formed, thus creating more boundaries in terms of refractive index. Thus, as compared with the configuration example in which the openings OP have a rectangular or L shape, the openings OP of this embodiment involve a more number of sides, thereby making it possible to improve the scattering reflectance.

Therefore, a high-performance scattering liquid crystal device using a lateral electric field can be provided.

Moreover, when the openings OP are arranged in the directions DR1 and DR2, a more isotropic distribution in refractive index can be achieved as compared to the configuration example in which the openings OP have a rectangular shape.

Next, a modified example of this embodiment will be described.

Figure 10:
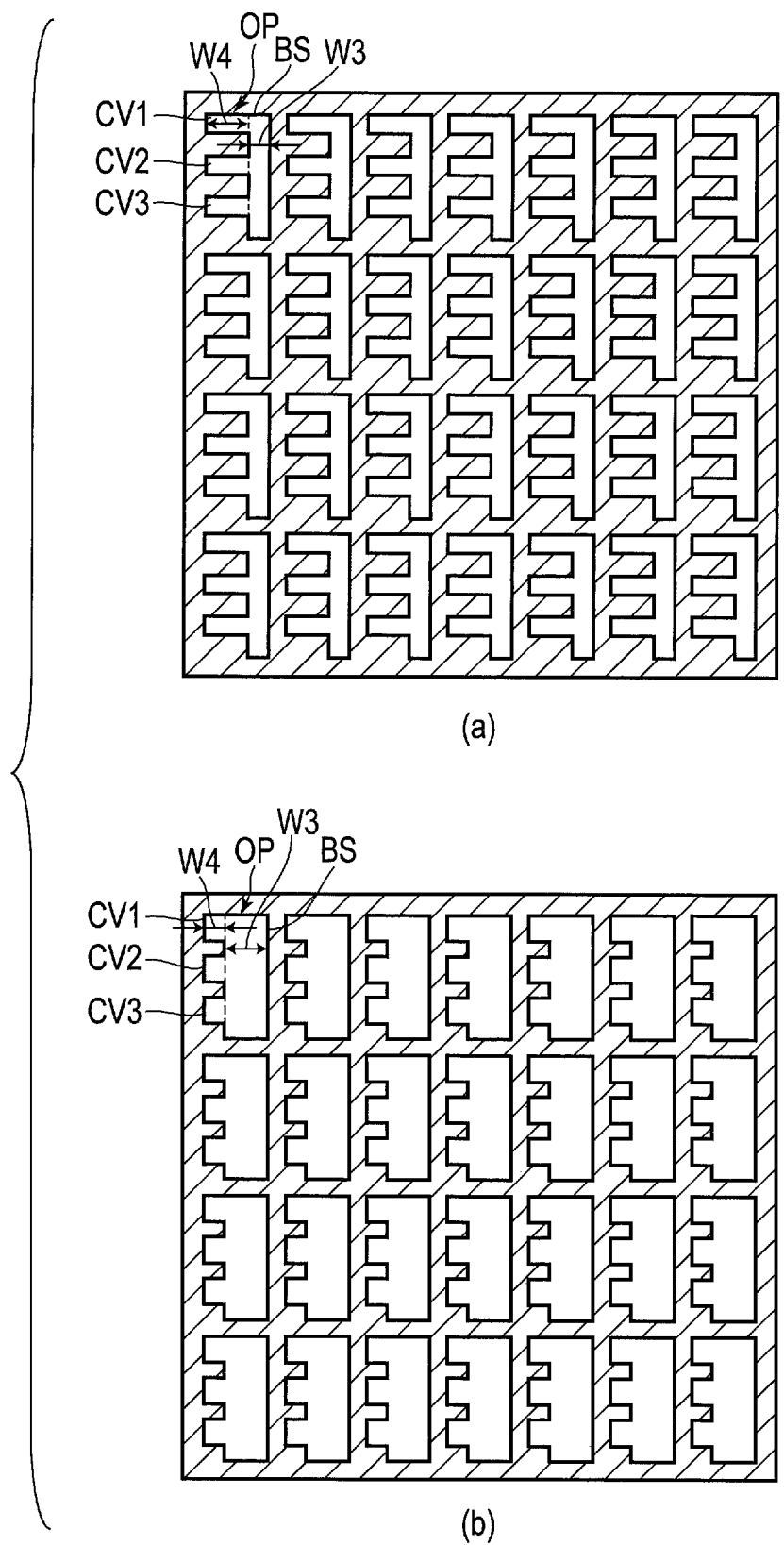
FIG. 10 is a plan view showing a modified example of the second electrode of this embodiment.

FIG. 10 is a plan view showing a modified example of the second electrode EL2 according to this embodiment.

FIG. 10, part (a) shows the second electrode EL2 which comprises openings OP in which the width W4 is greater than the width W3. FIG. 10, part (b) shows the second electrode EL2 which comprises openings OP in which the width W3 is greater than the width W4.

An advantageous effect similar to that described above can be achieved also in such a modified example.

FIG. 11 is a plan view showing another modified example of the second electrode EL2 according to this embodiment.

FIG. 11, part (a) shows the second electrode EL2 which comprises openings OP in which the interval IV is greater than the width W5. FIG. 11, part (b) shows the second electrode EL2 which comprises openings OP in which the width W5 is greater than the interval IV.

An advantageous effect similar to that described above can be achieved also in such a modified example.

Figure 12:
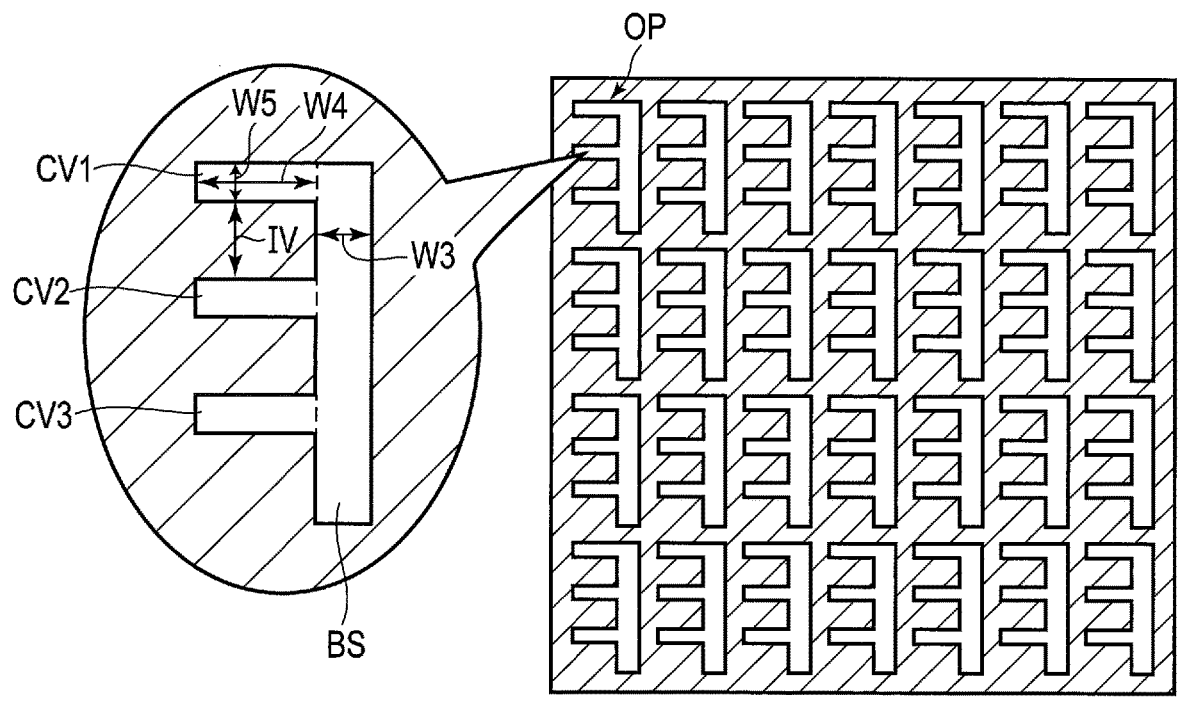
FIG. 12 is a plan view showing another modified example of the second electrode of this embodiment.
Figure 12:
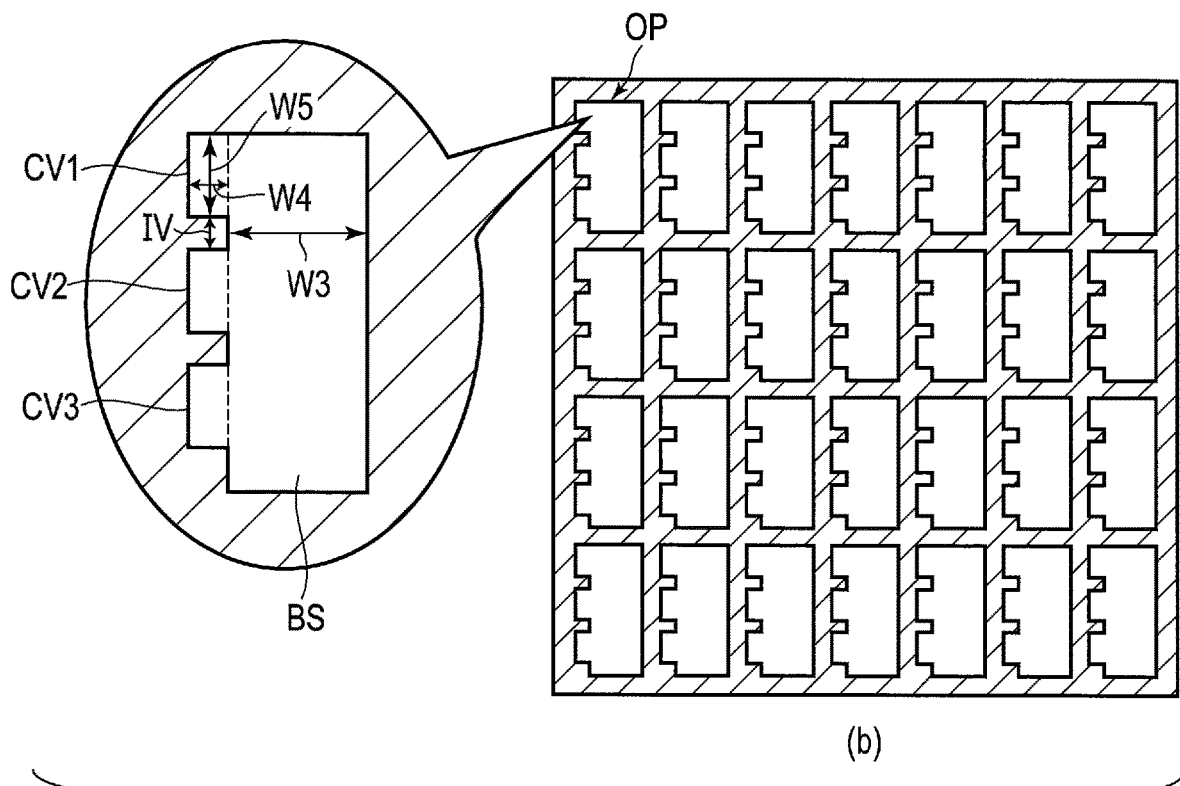

FIG. 12 is a plan view showing another modified example of the second electrode EL2 according to this embodiment.

FIG. 12, part (a) shows the second electrode EL2 which comprises openings OP in which the width W4 is greater than the width W3 and the interval IV is greater than the width W5. FIG. 12, part (b) shows the second electrode EL2 which comprises openings OP in which the width W3 is greater than the width W4 and the width W5 is greater than the interval IV.

An advantageous effect similar to that described above can be achieved also in such a modified example.

Figure 13:
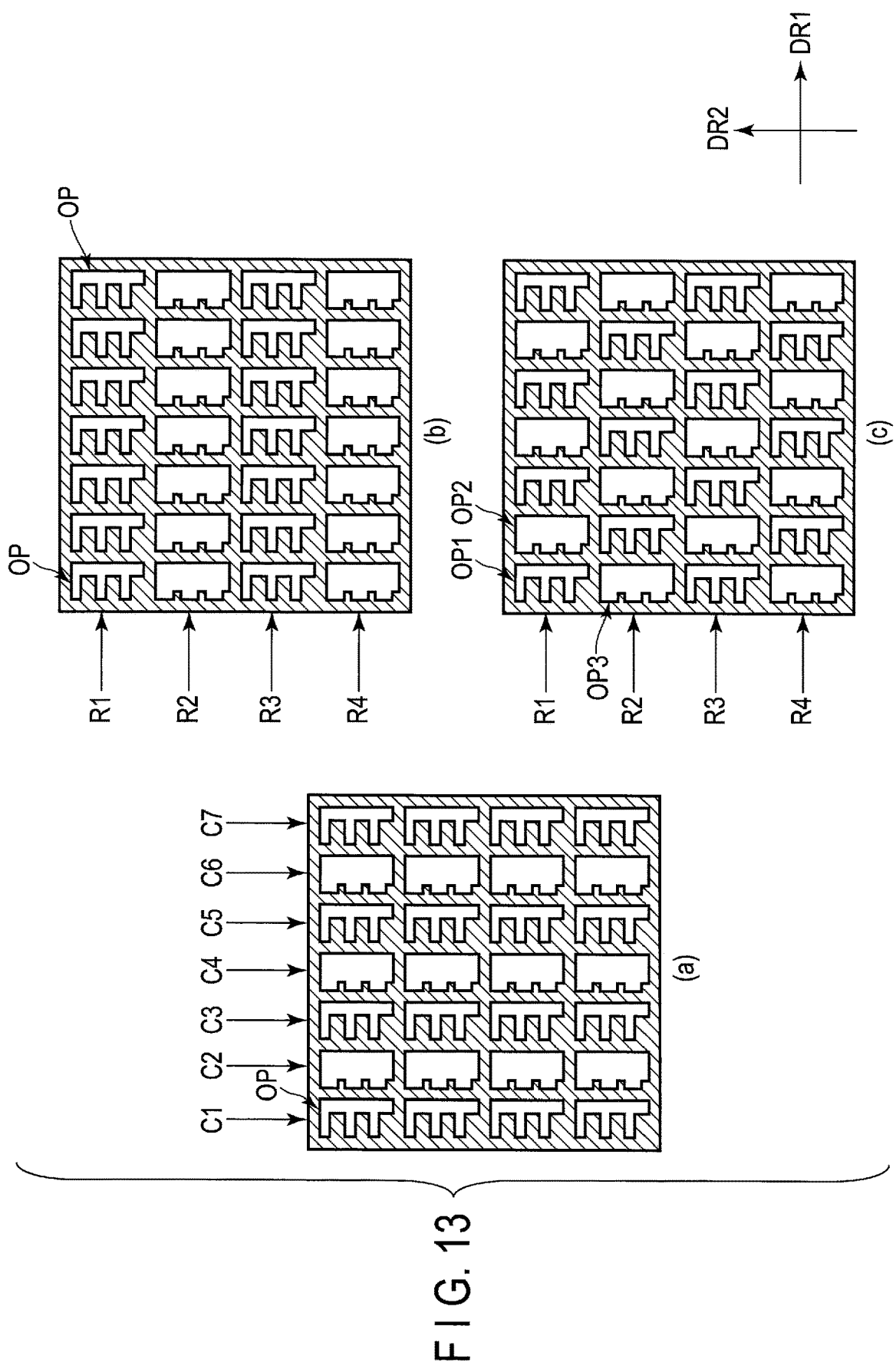
FIG. 13 is a plan view showing another modified example of the second electrode of this embodiment.

FIG. 13 is a plan view showing another modified example of the second electrode EL2 according to this embodiment.

In the example shown in FIG. 13, part (a), the shape of those of the openings OP, arranged in odd-numbered columns, namely, the first column C1, the third column C3, the fifth column C5 and the seventh column C7, the same as the shape of the openings OP shown in FIG. 12, part (a), and the shape of those of the openings OP, arranged in even-numbered columns, namely, the second column C2, the fourth column C4 and the sixth column C6 is the same as the shape of the openings OP shown in FIG. 12, part (b).

In the example shown in FIG. 13, part (b), the shape of those of the openings OP arranged in odd-numbered rows, namely, the first row R1, the third row R3 is the same as the shape of the openings OP shown in FIG. 12, part (a), and the shape of those of the openings OP, arranged in even-numbered rows, namely, the second row R2 and the fourth row R4 is the same as the shape of the openings OP shown in FIG. 12, part (b).

In an example shown in FIG. 13, part (c), the shape of those of the openings OP, arranged in odd-numbered rows, the first row R1 and the third row R3 shown in FIG. 12, part (a), and the shape of the openings OP shown in FIG. 12, part (b) are arranged alternately along the direction DR1. Meanwhile, in an example shown in FIG. 13, part (c), the shape of those of the openings OP, arranged in even-numbered rows, the second row R2 and the fourth row R4 shown in FIG. 12, part (b), and the shape of the openings OP shown in FIG. 12, part (a) are arranged alternately along the direction DR1. That is, the shape of the opening OP1 and that of the opening OP2 differ from each other, and the opening OP1 and the opening OP3 differ in shape from each other.

An advantageous effect similar to that described above can be achieved also in such a modified example.

Figure 14:
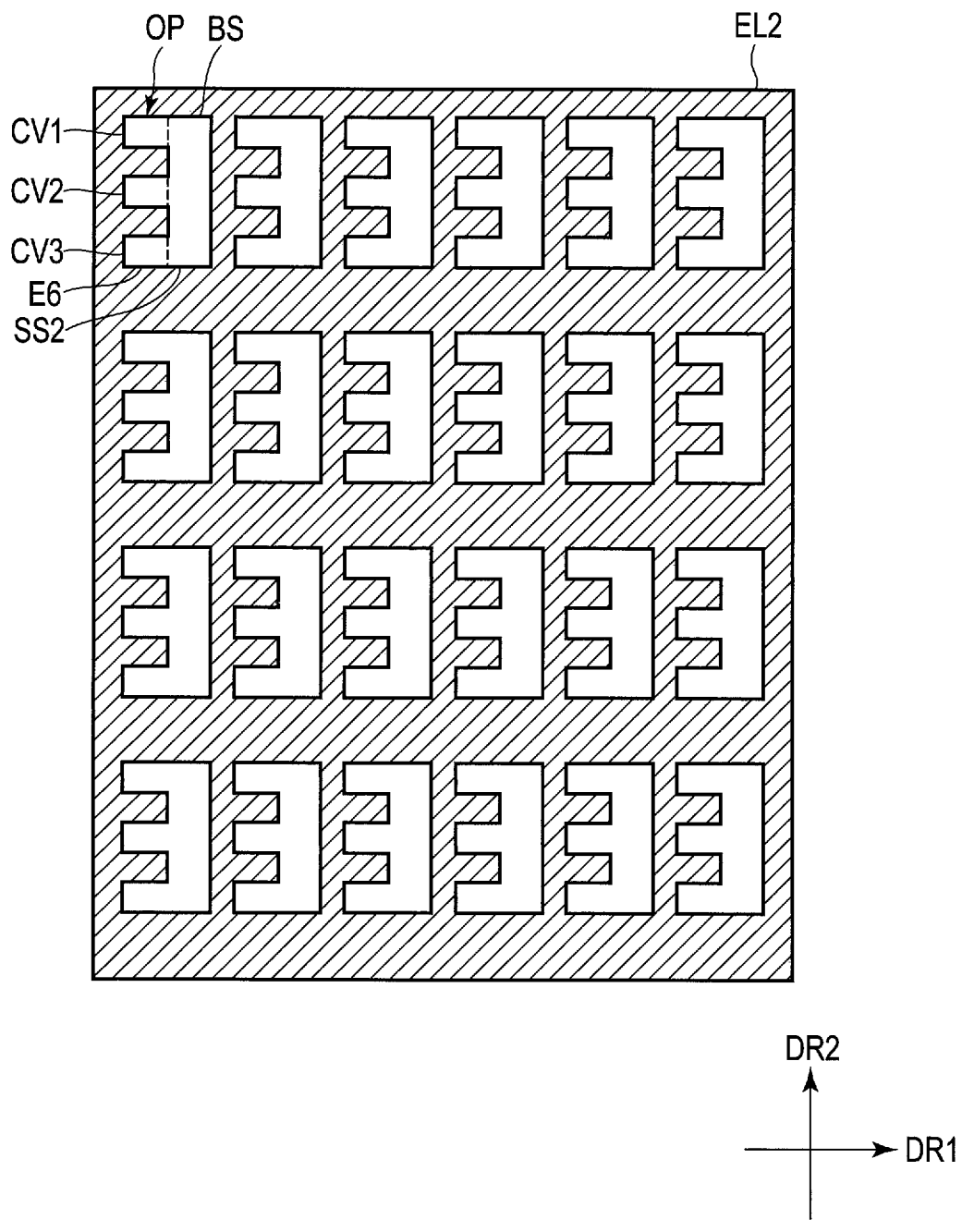
FIG. 14 is a plan view showing another modified example of the second electrode of this embodiment.

FIG. 14 is a plan view showing another modified example of the second electrode EL2 according to this embodiment.

The example of FIG. 14 is different from the second electrode EL shown in FIG. 5 or 6 in that the side E6 of the projecting portion CV3 is located on the same straight line together with the short side SS2 of the base portion BS. That is, as shown in FIG. 14, the openings OP are formed into an E shape.

An advantageous effect similar to that described above can be achieved also in such a modified example.

FIG. 15 is a plan view showing another modified example of the second electrode EL2 according to this embodiment.

The opening OP1 is formed into such a shape obtained by combining two of openings OP1 shown in FIG. 5 to be symmetry with respect to a line LN. The opening OP2 is formed into a rectangular shape.

In the example shown in FIG. 15, the shape of those of the openings OP, arranged in odd-numbered columns, namely, the first column C1, the third column C3, the fifth column C5 and the seventh column C7 is the same as the shape of the opening OP1, and the shape of those of the openings OP, arranged in even-numbered columns, namely, the second column C2, the fourth column C4 and the sixth column C6 is the same as the shape of the opening OP2. Further, the shape of the openings OP located on the second column C2, the fourth column C4 and the sixth column C6 is rectangular.

An advantageous effect similar to that described above can be achieved also in such a modified example.

FIG. 16 is a plan view showing another modified example of the second electrode EL2 according to this embodiment.

As shown in FIG. 16, part (b), the opening OP1 is different from the opening OP1 shown in FIG. 6 in that it further comprises a projecting portion CV4. The projecting portion CV4 projects in an opposite direction to the arrow indicating the direction DR1. The projecting portions CV1, CV2, CV3 and CV4 are arranged at equal intervals in this order in a direction opposite to the arrow indicating the direction DR2. The projecting portion CV4 comprises sides E7 and E8. The sides E7 and E8 oppose each other along the direction DR2. The side E7 crosses the long side LS1 of the base portion BS. The side E8 is located on the same straight line together with the short side SS2 of the base portion BS. Moreover, as shown in FIG. 16, part (c), the opening OP3 is different from the opening OP1 shown in FIG. 6 in that the side E1 of the projecting portion CV1 crosses the long side LS1 of the base portion BS. In other words, the side E1 of the projecting portion CV1 and the short side SS1 Of the base portion BS are not located on the same straight line.

Further, the side E6 of the projecting portion CV3 and the short side SS2 Of the base portion BS are not located on the same straight line.

In the example shown in FIG. 16, the shape of those of the openings OP, arranged in odd-numbered rows, the first row R1 and the third row R3 is the same as the shape of the opening OP1, and the shape of those of the openings OP, arranged in even-numbered rows, the second row R2 and the fourth row R4 is the same as the shape of the opening OP3.

An advantageous effect similar to that described above can be achieved also in such a modified example.

Figure 17:
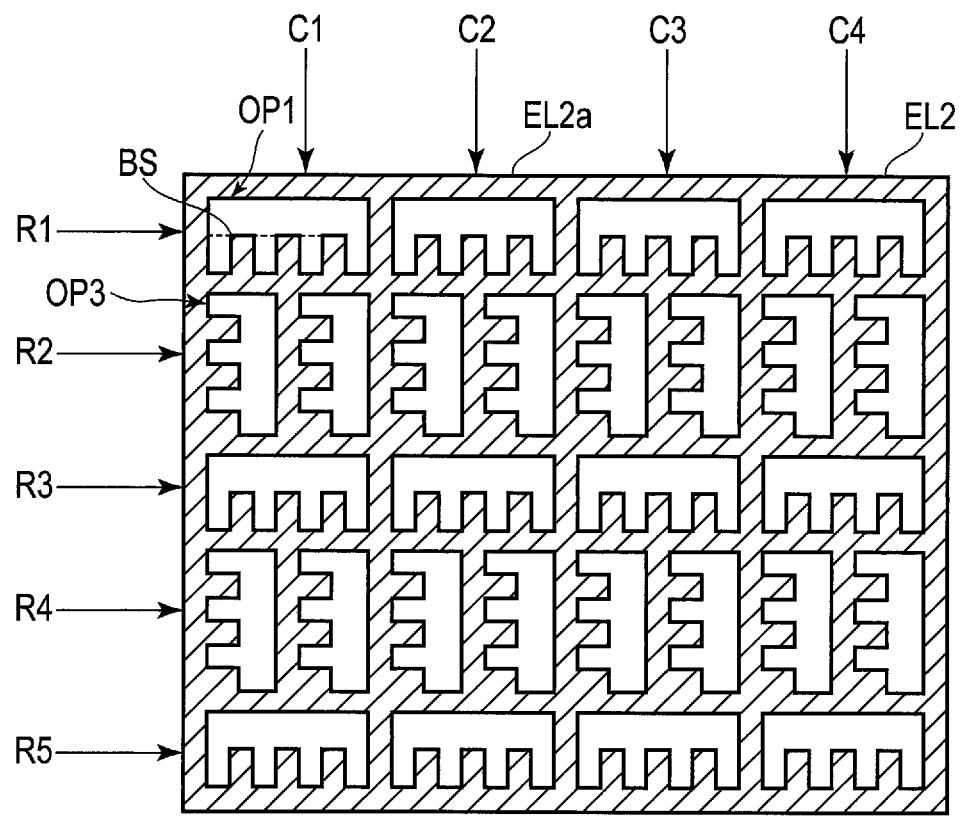
FIG. 17 is a plan view showing another modified example of the second electrode of this embodiment.

FIG. 17 is a plan view showing another modified example of the second electrode EL2 according to this embodiment.

The opening OP1 has a shape obtained by rotating by 90 degrees the opening OP1 shown in FIG. 16 such as to place the base portion BS on a side of the side EL2a of the second electrode EL2. The opening OP3 has the same shape as that of the opening OP1 shown in FIG. 5.

In the example shown in FIG. 17, the shape of those of the openings OP, arranged in odd-numbered rows, the first row R1, the third row R3 and the fifth row R5 is the same as the shape of the opening OP1, and the shape of those of the openings OP, arranged in even-numbered rows, the second row R2 and the fourth row R4 is the same as the shape of the opening OP3. Moreover, in the second and fourth rows R2 and R4 of the first to fourth columns C1, C2, C3 and C4, two of openings OP having the same shape as that of the opening OP3 are arranged.

An advantageous effect similar to that described above can be achieved also in such a modified example.

As shown in FIGS. 13, 15, 16 and 17, when the openings OP change their shapes in rows and column, it becomes possible to avoid successively lighting of light components, for example, red, blue and green, of the light source, to be viewed on the display screen.

Figure 18:
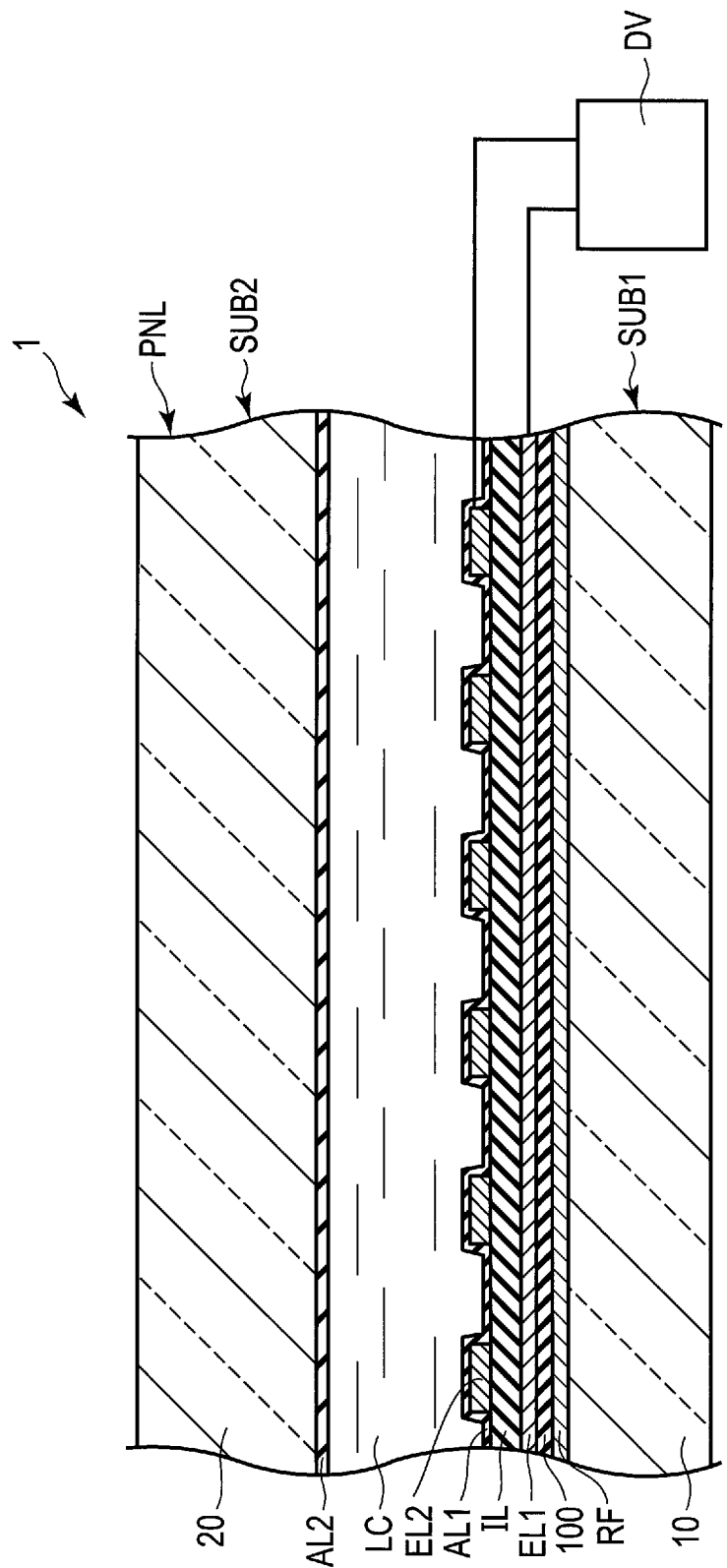
FIG. 18 is a plan view showing a modified example of the liquid crystal device of this embodiment.

FIG. 18 is a cross section showing another modified example of the liquid crystal device 1 according to this embodiment.

The liquid crystal device 1 shown in FIG. 18 is different from that shown in FIG. 1 in that the first substrate SUB1 comprises a reflective layer RF.

The reflective layer RF is provided on the first insulating substrate 10. The insulating film 100 is located between the reflective layer RF and the first electrode EL1. That is, the reflective layer RF is located under the first electrode EL1. The reflective layer RF is formed from a highly reflective metal material such as aluminum or silver.

Note that the reflective layer RF may be formed inside the display panel PNL as illustrated, or a reflector may be separately provided in an exterior of the first insulating substrate 10, (which is on a opposite side to the side opposing the liquid crystal layer LC).

Additionally, in the structure comprising the reflective layer RF, an auxiliary light source may be provided in the exterior of the second insulating substrate 20.

An advantageous effect similar to that described above can be achieved also in such a modified example.

Figure 19:
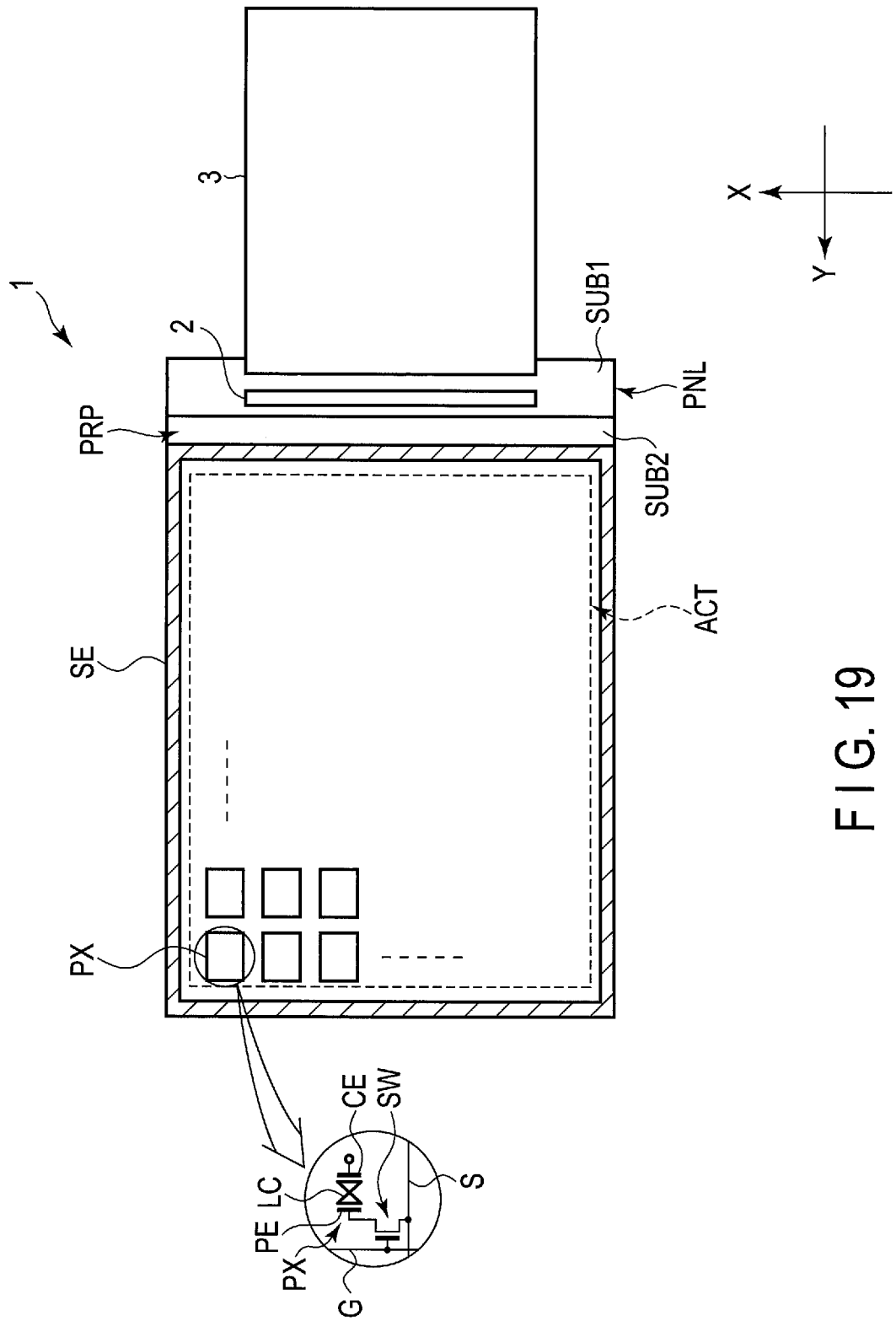
FIG. 19 is a plan view showing an embodiment of the case of applying the liquid crystal device of this embodiment as a display device.

FIG. 19 is a plan view showing an embodiment when the liquid crystal device 1 according to this embodiment is applied as a display device.

A display panel PNL comprises a first substrate SUB1, a second substrate SUB2 arranged to oppose the first substrate SUB1, and a liquid crystal layer LC held between the first substrate SUB1 and the second substrate SUB2. The first substrate SUB1 and the second substrate SUB2 are attached together with a sealing member SE while forming a predetermined cell gap therebetween. The liquid crystal layer LC is held on an inner side surrounded by the sealing member SE in the cell gap between the first substrate SUB1 and the second substrate SUB2. The display panel PNL comprises an active area ACT which displays images on the inner side surrounded by the sealing member SE. The active area ACT has, for example, approximately a rectangular shape, and comprises a plurality of pixels PX arranged in a matrix.

The first substrate SUB1 comprises, in the active area ACT, gate lines G extending along the first direction X, source lines S extending along the second direction Y crossing the first direction X, switching elements SW each electrically connected to a respective gate line G and a respective source line S in a respective pixel PX, pixel electrodes PE each electrically connected to a switching element SW in a respective pixel PX, etc. The first substrate SUB1 also comprises a common electrode CE.

Signal supply sources required to drive the display panels PNL, such as the drive IC chip 2 and the flexible printed circuit (FPC) substrate 3 are located in a peripheral area PRP outside the active area ACT.

Figure 20:
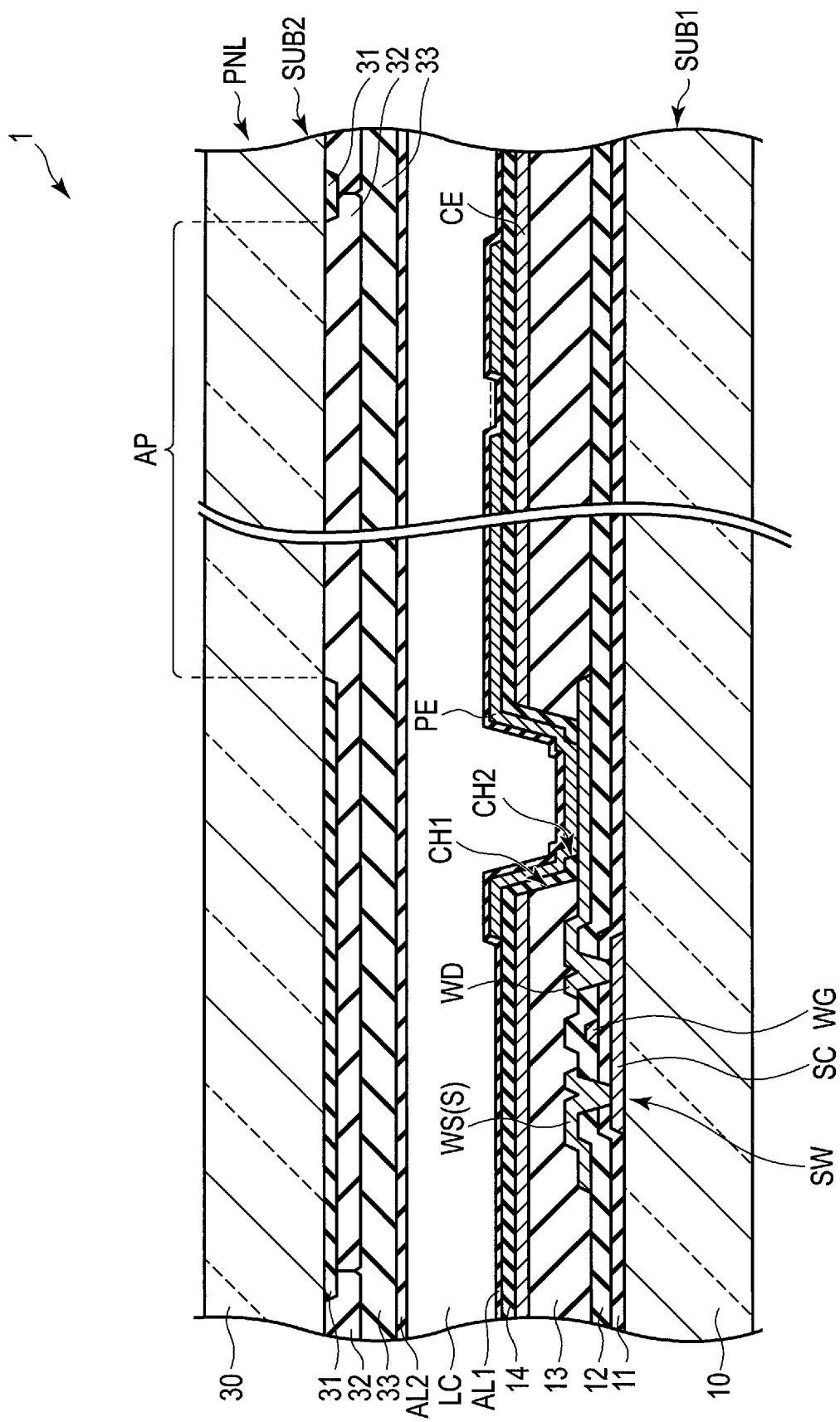
FIG. 20 is a cross section showing the configuration of the liquid crystal device shown in FIG. 19.

FIG. 20 is a cross section showing the structure of the liquid crystal device 1 shown in FIG. 19.

The first substrate SUB1 comprises, on a side of the first insulating substrate 10, which opposes the second substrate SUB2, the switching elements SW, the common electrode CE, the pixel electrodes PE, the first insulating film 11, the second insulating film 12, the third insulating film 13, the fourth insulating film 14, the first alignment film AL1, etc.

The switching elements SW each comprises a semiconductor layer SC, a gate electrode WG, a source electrode WS, a drain electrode WD and the like. The semiconductor layer SC is located on the first insulating substrate 10, and is covered by the first insulating film 11. The gate electrode WG is located on the first insulating film 11 and directly above the semiconductor layer SC. The gate electrode WG is covered by the second insulating film 12. The source electrode WS and the drain electrode WD are disposed on the second insulating film 12, and are covered by the third insulating film 13. The source electrode WS is electrically connected to the source line S. The source electrode WS and the drain electrode WD are each electrically connected to the semiconductor layer SC.

The common electrode CE is located on the third insulating film 13. On the common electrode CE, the fourth insulating film 14 is disposed.

The pixel electrode PE is disposed on the fourth insulating film 14 so as to oppose the common electrode CE. The pixel electrode PE is electrically connected to the drain electrode WD via a contact hole CH1 which penetrates the third insulating film 13 and a contact hole CH2 which penetrates the fourth insulating film 14. The common electrode CE and the pixel electrode PE are each formed from, for example, a transparent conductive material such as ITO or IZO. The pixel electrode PE is covered by the first alignment film AL1.

Here, the common electrode CE corresponds to the first electrode of this embodiment, the pixel electrode PE corresponds to the second electrode and the fourth insulating film 14 corresponds to the interlayer insulating film IL. Note that the common electrode CE may be located above the pixel electrode PE, and in this case, the common electrode CE corresponds to the second electrode and the pixel electrode PE corresponds to the first electrode.

The second substrate SUB2 comprises, on a side of the second insulating substrate 30, which opposes the first substrate SUB1, a light-shielding layer 31, a color filter 32, an overcoat layer 33, the second alignment film AL2, etc.

Note that the first insulating substrate 10 and the second insulating substrate 30 are each of a light transmissive substrate such as a glass or resin substrate.

The light shielding layer 31 partitions the pixels PX from each other and forms an opening AP, and are located to oppose wiring parts such as the gate lines G, source lines S and also the switching elements SW. The color filter 32 is disposed in the opening AP. The color filter 32 comprises color filters of different colors, for example, trichromatic filters of red, blue and green. Each boundary between the different colors in the color filter 32 is located to overlay on the light-shielding layer 31. Note that the color filter 32 need not be provided in such a scattering liquid crystal device as that of this embodiment.

The overcoat layer 33 covers the color filter 32. The overcoat layer 33 is covered by the second alignment film AL2. The first alignment film AL1 and the second alignment film AL2 are formed from a material which exhibits horizontal alignment property.

When this embodiment is applied to such a liquid crystal device DSP, an advantageous effect similar to that described above can be achieved.

The scattering liquid crystal device of the above-described embodiment can be used as a display. Alternatively, it is applicable also to such usage as a privacy film whose entire surface is processed to be scatterable to make another side of the display panel invisible. Further, the entire surface can be made scatterable, to be applied also as a screen for projecting images with a projector.

FIG. 21 is a diagram showing the positions of the second electrodes EL2 and the switching elements SW with relative to each other.

Each second electrode EL2 is surrounded by an adjacent pair of two gate lines G and adjacent pair of two source lines S. In this case, the second electrode EL2 comprises a bent portion BD on an inner side of the respective pixel PX, near the switching element SW but avoid the switching element SW. Here, the openings OP1 and OP2 each comprise two projecting portions, and the width of the openings OP1 and OP2 along the second direction Y is less than the width of the opening OP3 along the second direction Y.

An advantageous effect similar to that described above can be achieved also with such a configuration.

As described above, according to this embodiment, a high-performance scattering liquid crystal device using a lateral electric field can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal device comprising:
a first substrate including a first electrode and a second electrode opposing the first electrode;
a second substrate opposing the first substrate; and
a liquid crystal layer containing liquid crystal molecules and held between the first substrate and the second substrate,
the second electrode being located on a side of the liquid crystal layer with respect to the first electrode and comprising a first opening,
the first opening being formed into a polygonal shape comprising a base portion and at least one projecting portion projecting from the base portion along a first direction,
the base portion extending along a second direction substantially perpendicular to the first direction,
the projecting portion projecting perpendicularly to the base portion,
a width of the base portion along the first direction is greater than a width of the projecting portion along the first direction, and
the liquid crystal layer exhibiting transparency while no voltage being applied and scattering property while voltage being applied.

2. A liquid crystal device comprising:
a first substrate including a first electrode and a second electrode opposing the first electrode;
a second substrate opposing the first substrate; and
a liquid crystal layer containing liquid crystal molecules and held between the first substrate and the second substrate,
the second electrode being located on a side of the liquid crystal layer with respect to the first electrode and comprising a first opening,
the first opening being formed into a polygonal shape comprising a base portion and at least three projecting portions projecting from the base portion along a first direction,
a width of the base portion along the first direction is greater than a width of at least one of the projecting portions along the first direction,
the liquid crystal layer exhibiting transparency while no voltage being applied and scattering property while voltage being applied, and
the at least three projecting portions are arranged at equal intervals along a second direction crossing the first direction.

3. A liquid crystal device comprising:
a first substrate including a first electrode and a second electrode opposing the first electrode;
a second substrate opposing the first substrate; and
a liquid crystal layer containing liquid crystal molecules and held between the first substrate and the second substrate,
the second electrode being located on a side of the liquid crystal layer with respect to the first electrode and comprising a first opening,
the first opening being formed into a polygonal shape comprising a base portion, and a first projecting portion and a second projecting portion projecting from the base portion along a first direction,
the first projecting portion and the second projecting portion being arranged along a second direction crossing the first direction,
a width of the first projecting portion along the second direction is greater than an interval between the first projecting portion and the second projecting portion along the second direction, and
the liquid crystal layer exhibiting transparency while no voltage being applied and scattering property while voltage being applied.

4. The liquid crystal device of claim 3, wherein
the first opening comprises a third projecting portion projecting from the base portion in the first direction, and
the first projecting portion, the second projecting portion and the third projecting portion are arranged at equal intervals along the second direction.

5. The liquid crystal device of claim 3, wherein
the width of the base portion along the first direction is greater than the width of the first projecting portion along the first direction.

6. The liquid crystal device of claim 1, wherein
a width of the first opening along the second direction crossing the first direction is equal to or three times or less the width of the first opening along the first direction.

7. A liquid crystal device comprising:
a first substrate including a first electrode and a second electrode opposing the first electrode;
a second substrate opposing the first substrate; and
a liquid crystal layer containing liquid crystal molecules and held between the first substrate and the second substrate,
the second electrode being located on a side of the liquid crystal layer with respect to the first electrode and comprising a first opening,
the first opening being formed into a polygonal shape comprising a base portion, and a first projecting portion and a second projecting portion projecting from the base portion along a first direction,
the first projecting portion and the second projecting portion project to the same side of the base portion, and
the liquid crystal layer exhibiting transparency while no voltage being applied and scattering property while voltage being applied.

8. A liquid crystal device comprising:
a first substrate including a first electrode and a second electrode opposing the first electrode;
a second substrate opposing the first substrate; and
a liquid crystal layer containing liquid crystal molecules and held between the first substrate and the second substrate,
the second electrode being located on a side of the liquid crystal layer with respect to the first electrode and comprising a first opening,
the first opening being formed into a polygonal shape comprising a base portion, and a first projecting portion, a second projecting portion, a third projecting portion projecting from the base portion along a first direction,
the liquid crystal layer exhibiting transparency while no voltage being applied and scattering property while voltage being applied, and
the first opening comprises a third projecting portion projecting from the base portion in the first direction, and
the first projecting portion, the second projecting portion and the third projecting portion are arranged along a second direction crossing the first direction.

9. The liquid crystal device of claim 8, wherein
widths of the first projecting portion, the second projecting portion and the third projecting portion along the first direction are equal to each other.

10. The liquid crystal device of claim 9, wherein
a first side of the first projecting portion is located on a same straight line on which a first short side of the base portion is located,
a second side opposing the first side of the first projecting portion, a third side of the third projecting portion and a fourth side opposing the third side of the third projecting portion cross a long side of the base portion.

11. The liquid crystal device of claim 9, wherein
a first side of the first projecting portion is located on a same straight line on which a first short side of the base portion is located,
a second side opposing the first side of the first projecting portion crosses the long side of the base portion,
a third side of the third projecting portion crossing the long side of the base portion, and
a fourth side opposing the third side of the third projecting portion is a located on a same straight line on which the second short side opposing the first short side of the base portion is located.

12. The liquid crystal device of claim 1, wherein
an initial alignment direction of the liquid crystal molecules while no voltage is being applied is parallel to the first direction.

13. The liquid crystal device of claim 1, wherein
the first opening comprises a side parallel to the initial alignment direction of the liquid crystal molecules while no voltage being applied and a side perpendicular to the initial alignment direction.

14. The liquid crystal device of claim 1, wherein
the second electrode comprises a second opening adjacent to the first opening along the first direction and a third opening adjacent thereto in the second direction crossing the first direction.

15. The liquid crystal device of claim 14, wherein
the first opening, the second opening and the third opening have an identical shape.

16. The liquid crystal device of claim 15, wherein
the first opening, the second opening and the third opening are directed in a same direction.

17. The liquid crystal devices of claim 15, wherein
the first opening and the second opening are different from each other in shape, and the first opening and the third opening are different from each other in shape.

18. The liquid crystal device of claim 1, wherein
the first electrode and the second electrode are transparent conductive layers.

19. The liquid crystal device of claim 18, wherein
the first substrate further comprises a reflector.

20. The liquid crystal device of claim 1, wherein
the first electrode is a reflective layer and the second electrode is a transparent conductive layer.

* * * * *